US012424784B2

(12) United States Patent
Chen et al.

(10) Patent No.: US 12,424,784 B2
(45) Date of Patent: Sep. 23, 2025

(54) MULTI-PIECE CONNECTOR WITH ADJUSTABLE CONNECTOR SUB-COMPONENTS

(71) Applicant: Tarng Yu Enterprise co., ltd., New Taipei (TW)

(72) Inventors: Ying-Chung Chen, New Taipei (TW); Mu-Jung Huang, New Taipei (TW)

(73) Assignee: Tarng Yu Enterprise co., ltd., New Taipei (TW)

( * ) Notice: Subject to any disclaimer, the term of this patent is extended or adjusted under 35 U.S.C. 154(b) by 391 days.

(21) Appl. No.: 18/088,414

(22) Filed: Dec. 23, 2022

(65) Prior Publication Data

US 2023/0208068 A1 Jun. 29, 2023

(30) Foreign Application Priority Data

Dec. 23, 2021 (TW) ................................ 110148559

(51) Int. Cl.

| | |
|---|---|
| ***H01R 13/50*** | (2006.01) |
| ***H01R 13/11*** | (2006.01) |
| ***H01R 13/405*** | (2006.01) |
| ***H01R 13/502*** | (2006.01) |
| ***H01R 13/516*** | (2006.01) |
| ***H01R 13/64*** | (2006.01) |
| ***H01R 43/20*** | (2006.01) |

(52) U.S. Cl.

CPC ........... *H01R 13/502* (2013.01); *H01R 13/11* (2013.01); *H01R 13/405* (2013.01); *H01R 13/516* (2013.01); *H01R 13/64* (2013.01); *H01R 43/20* (2013.01)

(58) Field of Classification Search

CPC ..... H01R 12/721; H01R 12/73; H01R 12/737
USPC ........ 439/629, 630, 631, 634, 636, 637, 108
See application file for complete search history.

(56) References Cited

U.S. PATENT DOCUMENTS

| | | | | |
|---|---|---|---|---|
| 9,972,945 B1 * | 5/2018 | Huang | ............... | H01R 13/6585 |
| 10,601,160 B2 * | 3/2020 | Kao | ....................... | H05K 1/117 |

FOREIGN PATENT DOCUMENTS

| | | |
|---|---|---|
| TW | M567976 U | 10/2018 |
| TW | M609160 U | 3/2021 |
| TW | M614728 U | 7/2021 |

OTHER PUBLICATIONS

Official action issued by Taiwan Intellectual Property Office on Oct. 18, 2022.

* cited by examiner

*Primary Examiner* — Phuong K Dinh
(74) *Attorney, Agent, or Firm* — LANWAY IPR SERVICES; Chun-Ming Shih

(57) ABSTRACT

A multi-piece connector is provided. The multi-piece connector is formed by using an assembling component to assemble a primary connector sub-component and a secondary connector sub-component to a plastic casing. Thus, even if the connector is finished, the number and structure of conductive terminals of the connector can still be modified and customized by adjusting the primary connector sub-component and the secondary connector sub-component in response to development requirements for the electronic device. The terminals may be posited in two rows and a jumper strip between the rows for grounding.

19 Claims, 27 Drawing Sheets

B-B

D-D

E-E

F-F

MULTI-PIECE CONNECTOR WITH ADJUSTABLE CONNECTOR SUB-COMPONENTS

CROSS-REFERENCE TO RELATED APPLICATIONS

This application claims the priority of Republic of China Patent Application No. 110148559 filed on Dec. 23, 2021, in the State Intellectual Property Office of the R.O.C., the disclosure of which is incorporated herein by reference.

BACKGROUND OF THE INVENTION

Field of the Invention

The present invention relates to electronic device technologies, and more particularly, to a multi-piece connector that can be customized to adjust the number and structure of conductive terminals.

Descriptions of the Related Art

Modern electronic devices are usually provided with connectors for transmitting signals. It is mostly desirable that the number and structure of connectors can be customized to fulfill signal transmission requirements. This is however not the case in the meantime that when a connector is made and completed, its conductive terminals are fixed in number and structure but can no longer be modified, undesirably making the connector fail to meet the signal transmission requirements for an electronic device using it.

Moreover, if parts of a plurality of conductive terminals formed on the connector need to be electrically interconnected, the only option is to use an additional jumper for the connector to achieve such electrical interconnection, while as the jumper occupies internal space of the electronic device, it makes the electronic device not able to be made more compact in size.

Therefore, how to provide a connector that can be customized to adjust the number and structure of conductive terminals, is an important task in the art.

SUMMARY OF THE INVENTION

In view of the above drawbacks in the prior art, the present invention provides a multi-piece connector. The multi-piece connector includes a primary connector sub-component, a secondary connector sub-component and an assembling component. The primary connector sub-component includes a primary assembling structure. The secondary connector sub-component includes a secondary assembling structure. The assembling component is respectively fitted to the primary assembling structure and the secondary assembling structure to assemble the primary connector sub-component with the secondary connector sub-component to form a connector sub-component assembly.

Preferably, the multi-piece connector said above, wherein the assembling component includes a primary assembling sub-component and a secondary assembling sub-component, wherein in the connector sub-component assembly, the primary assembling sub-component is fitted to the primary assembling structure, and the secondary assembling sub-component is fitted to the secondary assembling structure.

Preferably, the multi-piece connector said above, wherein the primary assembling sub-component and the secondary assembling sub-component are combined and integrally formed.

Preferably, the multi-piece connector said above, wherein the primary assembling sub-component includes a primary assembling sub-component interference structure, and the secondary assembling sub-component includes a secondary assembling sub-component interference structure, wherein in the connector sub-component assembly, the primary assembling sub-component interference structure is attached to the primary assembling structure, and the secondary assembling sub-component interference structure is attached to the secondary assembling structure.

Preferably, the multi-piece connector said above, wherein the primary connector sub-component further includes a primary X-direction assembling sub-structure, a primary Y-direction assembling sub-structure and a primary Z-direction assembling sub-structure, and the secondary connector sub-component further includes a secondary X-direction assembling sub-structure, a secondary Y-direction assembling sub-structure and a secondary Z-direction assembling sub-structure, wherein in the connector sub-component assembly, the primary X-direction assembling sub-structure is attached to the secondary connector sub-component in X direction, the primary Y-direction assembling sub-structure is attached to the secondary connector sub-component in Y direction, the secondary X-direction assembling sub-structure is attached to the primary connector sub-component in X direction, the secondary Y-direction assembling sub-structure is attached to the primary connector sub-component in Y direction, and the assembling component is attached to the primary Z-direction assembling sub-structure and the secondary Z-direction assembling sub-structure respectively in Z-direction, wherein the X direction, the Y direction and the Z direction are vertical to each other.

Preferably, the multi-piece connector said above, wherein the primary X-direction assembling sub-structure, the primary Y-direction assembling sub-structure and the primary Z-direction assembling sub-structure are combined to form a rectangular hole, and the secondary X-direction assembling sub-structure, the secondary Y-direction assembling sub-structure and the secondary Z-direction assembling sub-structure are combined to form a rectangular hole.

Preferably, the multi-piece connector said above, wherein each of the primary Z-direction assembling sub-structure and the secondary Z-direction assembling sub-structure is a socket structure, and the assembling component has a plug structure, wherein in the connector sub-component assembly, the plug structure is plugged into the primary Z-direction assembling sub-structure and the secondary Z-direction assembling sub-structure.

Preferably, the multi-piece connector said above, wherein the primary connector sub-component further includes a primary plastic core, and the primary plastic core includes a primary fitting block, wherein the primary X-direction assembling sub-structure, the primary Y-direction assembling sub-structure and the primary Z-direction assembling sub-structure are provided at the primary fitting block, wherein in the connector sub-component assembly, the primary fitting block enters the secondary connector sub-component to allow the primary X-direction assembling sub-structure and the primary Y-direction assembling sub-structure to be respectively attached to the secondary connector sub-component.

Preferably, the multi-piece connector said above, wherein the secondary connector sub-component further includes a secondary plastic core, and the secondary plastic core includes a secondary fitting block, wherein the secondary X-direction assembling sub-structure, the secondary Y-direction assembling sub-structure and the secondary Z-direction assembling sub-structure are provided at the secondary fitting block, wherein in the connector sub-component assembly, the secondary fitting block enters the primary connector sub-component to allow the secondary X-direction assembling sub-structure and the secondary Y-direction assembling sub-structure to be respectively attached to the primary connector sub-component.

Preferably, the multi-piece connector said above, wherein in the connector sub-component assembly, the secondary fitting block is adjacent to the primary fitting block, and the secondary Z-direction assembling sub-structure and the primary Z-direction assembling sub-structure are aligned in a row.

Preferably, the multi-piece connector said above, wherein each of the secondary fitting block and the primary fitting block is a rectangular block.

Preferably, the multi-piece connector said above, further including: a plastic casing having a receiving space for accommodating the primary plastic core and the secondary plastic core, wherein the primary plastic core includes a primary fastening structure, and the secondary plastic core includes a secondary fastening structure, wherein when the primary plastic core and the secondary plastic core are received in the receiving space, the primary fastening structure and the secondary fastening structure are fastened to the plastic casing to position the primary plastic core and the secondary plastic core respectively.

Preferably, the multi-piece connector said above, further including: a primary jumper conductor, wherein the primary connector sub-component further includes at least one primary first conductive terminal and a plurality of primary second conductive terminals, wherein the primary jumper conductor goes over the primary first conductive terminal to reach and abut each of the primary second conductive terminals so as to make the primary second conductive terminals electrically connected to each other to form a primary second conductive circuit.

Preferably, the multi-piece connector said above, wherein further includes: a secondary jumper conductor, and the secondary connector sub-component further includes at least one secondary first conductive terminal and a plurality of secondary second conductive terminals, wherein the secondary jumper conductor goes over the secondary first conductive terminal to reach and abut each of the secondary second conductive terminals so as to make the secondary second conductive terminals electrically connected to each other to form a secondary second conductive circuit.

Preferably, the multi-piece connector said above, wherein the primary jumper conductor includes a primary jumper conductor interference structure, and the secondary jumper conductor includes a secondary jumper conductor interference structure, wherein the primary jumper conductor interference structure and the secondary jumper conductor interference structure are respectively for interfering with fitting to the assembling component.

Preferably, the multi-piece connector said above, wherein the plastic casing further includes a primary abutting structure and a secondary abutting structure, wherein the primary abutting structure abuts and positions the primary first conductive terminal and the primary second conductive terminals, and the secondary abutting structure abuts and positions the secondary first conductive terminal and the secondary second conductive terminals.

Preferably, the multi-piece connector said above, wherein the primary jumper conductor includes a primary jumper conductor body and a plurality of primary jumper conductor elastic arms, wherein the primary jumper conductor body is connected to the primary jumper conductor elastic arms, and each of the primary jumper conductor elastic arms elastically abuts one of the plurality of primary second conductive terminals; and the secondary jumper conductor includes a secondary jumper conductor body and a plurality of secondary jumper conductor elastic arms, wherein the secondary jumper conductor body is connected to the secondary jumper conductor elastic arms, and each of the secondary jumper conductor elastic arms elastically abuts one of the plurality of secondary second conductive terminals.

Preferably, the multi-piece connector said above, wherein the primary jumper conductor body is connected to the secondary jumper conductor body to make the primary jumper conductor and the secondary jumper conductor together form a jumper conductor assembly in which the primary second conductive circuit is electrically connected to the secondary second conductive circuit.

Preferably, the multi-piece connector said above, wherein the assembling component is attached to the jumper conductor assembly in the Z direction so as to assemble the jumper conductor assembly with the connector sub-component assembly.

Preferably, the multi-piece connector said above, wherein the jumper conductor assembly is made of metallic conductor, and the assembling component is made of conductive plastic or insulating plastic.

In summary, the multi-piece connector in the present invention is formed by using an assembling component to assemble a primary connector sub-component and a secondary connector sub-component to a plastic casing. Thus, even if the connector is finished, the number and structure of conductive terminals of the connector can still be modified and customized by adjusting the primary connector sub-component and the secondary connector sub-component in response to development requirements for the electronic device.

Moreover, the present invention provides a multi-piece connector, which includes a jumper conductor for electrically interconnecting parts of conductive terminals of the connector, without having to use any additional jumper, such that an electronic device having such a connector can be made more compact in size.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
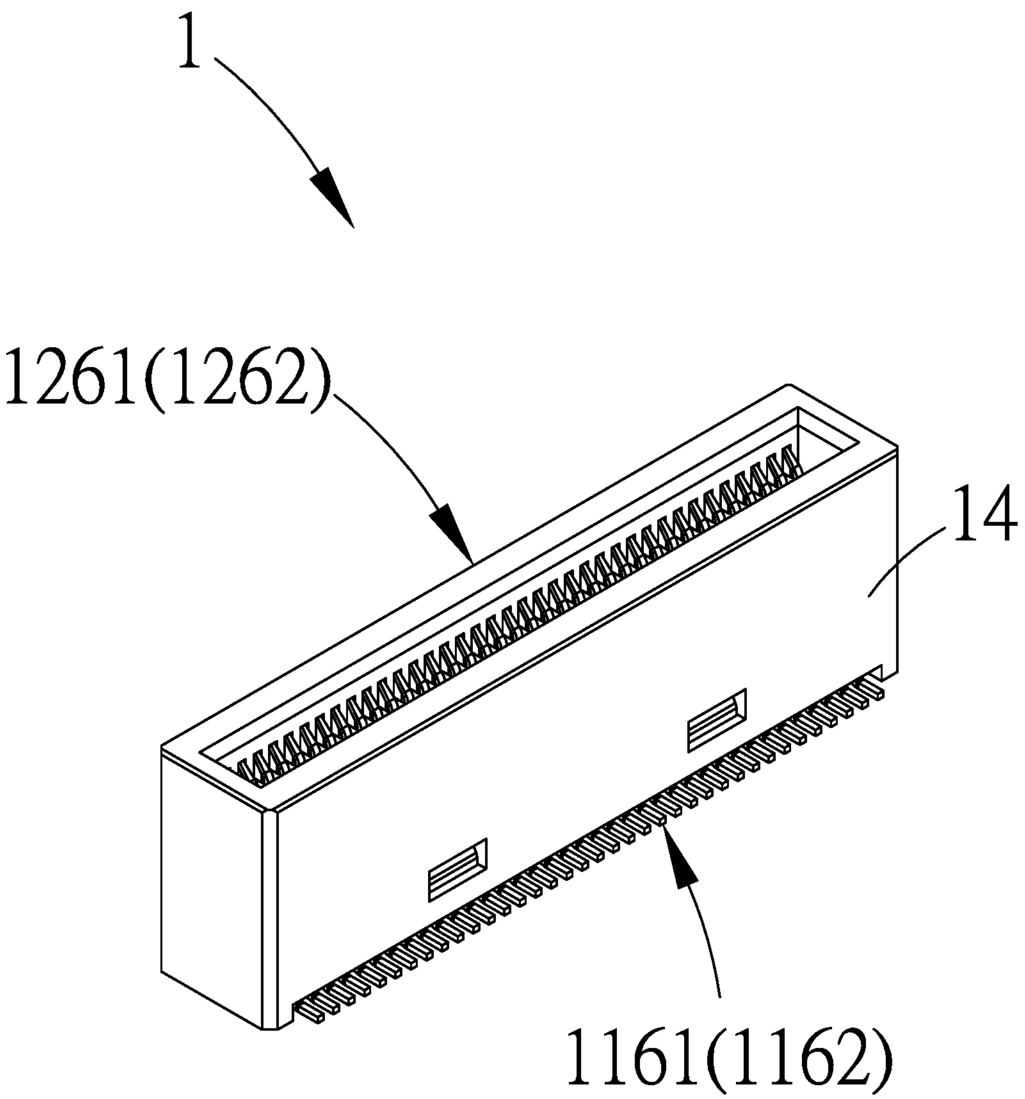
FIG. 1 is a three-dimensional schematic diagram showing preferred embodiment of a multi-piece connector according to the present invention.
Figure 2:
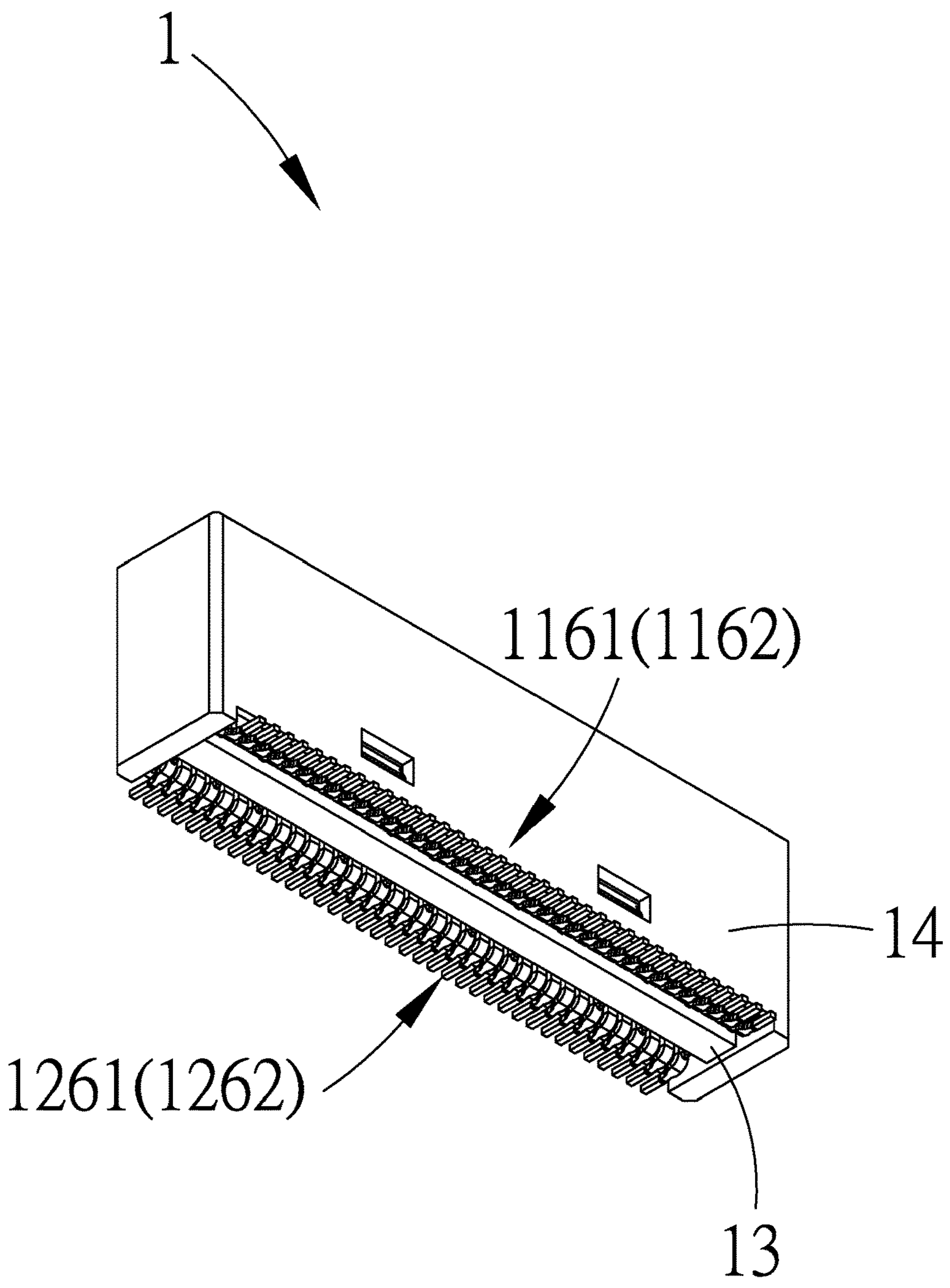
FIG. 2 is a three-dimensional schematic diagram showing preferred embodiment of a multi-piece connector according to the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like components.

Technical features of the present invention are described with reference to preferred embodiments disclosed herein and FIGS. 1 to 27.

The present invention provides a multi-piece connector for use in signal transmission. In the embodiments shown in FIGS. 3 to 5 and FIGS. 13 to 17 of the present application, the multi-piece connector 1 includes a primary connector sub-component 11, a secondary connector sub-component 12, an assembling component 13, a plastic casing 14, a primary jumper conductor 15 and a secondary jumper conductor 16.

In the above embodiments, the primary connector sub-component 11 includes a primary assembling structure 111. The secondary connector sub-component 12 includes a secondary assembling structure 121. The assembling component 13 is respectively attached to the primary assembling structure 111 and the secondary assembling structure 121, making the primary connector sub-component 11 and the secondary connector sub-component 12 together form a connector sub-component assembly B1.

The assembling component 13 is made of for example conductive plastic or insulating plastic, and includes a primary assembling sub-component 131 and a secondary assembling sub-component 132. In the connector sub-component assembly B1, the primary assembling sub-component 131 is attached to the primary assembling structure 111 of the primary connector sub-component 11, and the secondary assembling sub-component 132 is attached to the secondary assembling structure 121 of the secondary connector sub-component 12. More specifically, the primary assembling sub-component 131 includes a primary assembling sub-component interference structure 1311, and the secondary assembling sub-component 132 includes a secondary assembling sub-component interference structure 1321. In the connector sub-component assembly B1, the primary assembling sub-component interference structure 1311 interferes with fitting to the primary assembling structure 111 to allow the primary assembling sub-component 131 to be tightly fitted to the primary connector sub-component 11 (that is, interference fit), and the secondary assembling sub-component interference structure 1321 interferes with fitting to the secondary assembling structure 121 to allow the secondary assembling sub-component 132 to be tightly fitted to the secondary connector sub-component 12 (that is, interference fit).

Figure 4:
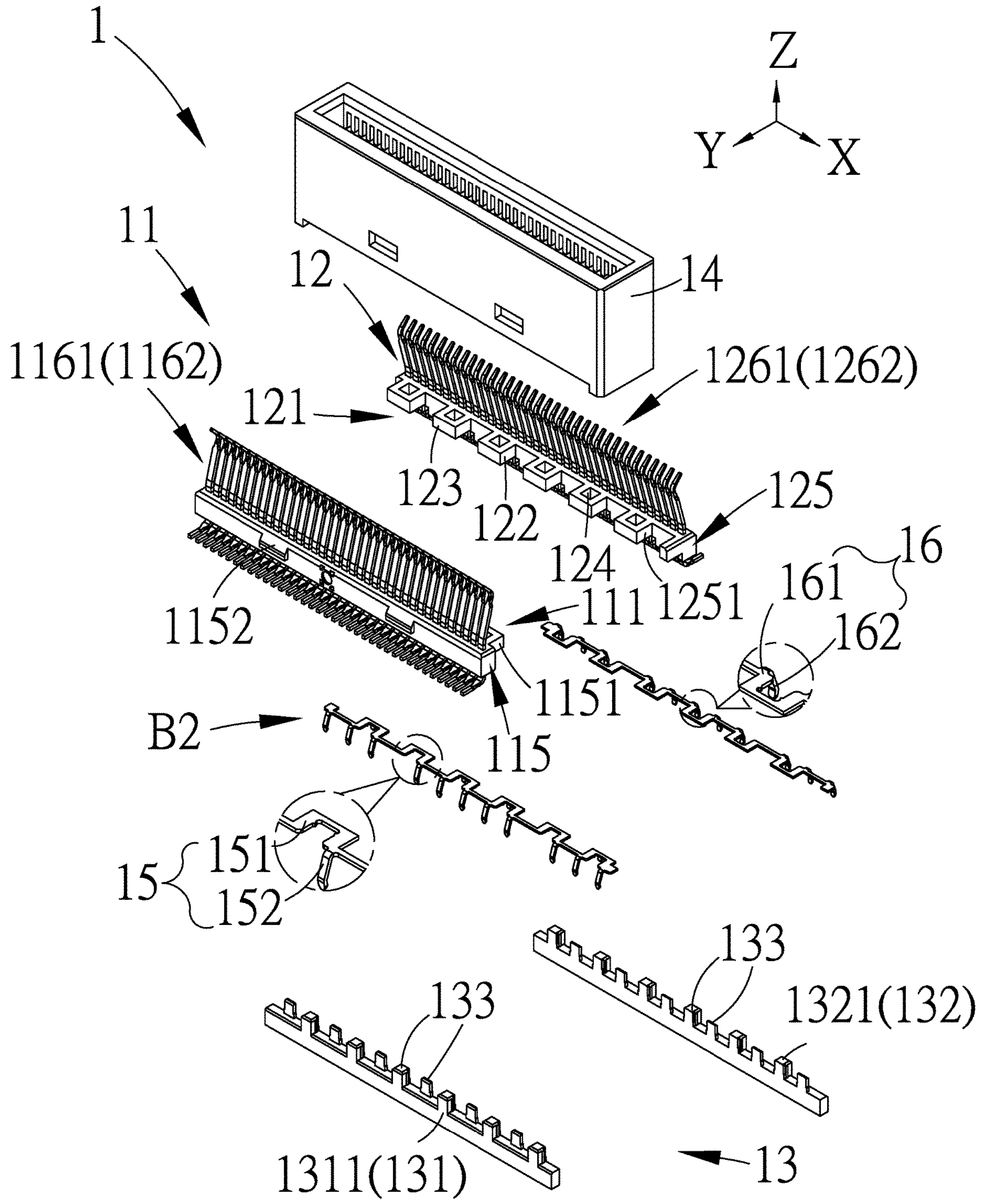
FIG. 4 is an exploded view schematic diagram showing preferred embodiment of a multi-piece connector according to the present invention.
Figure 5:
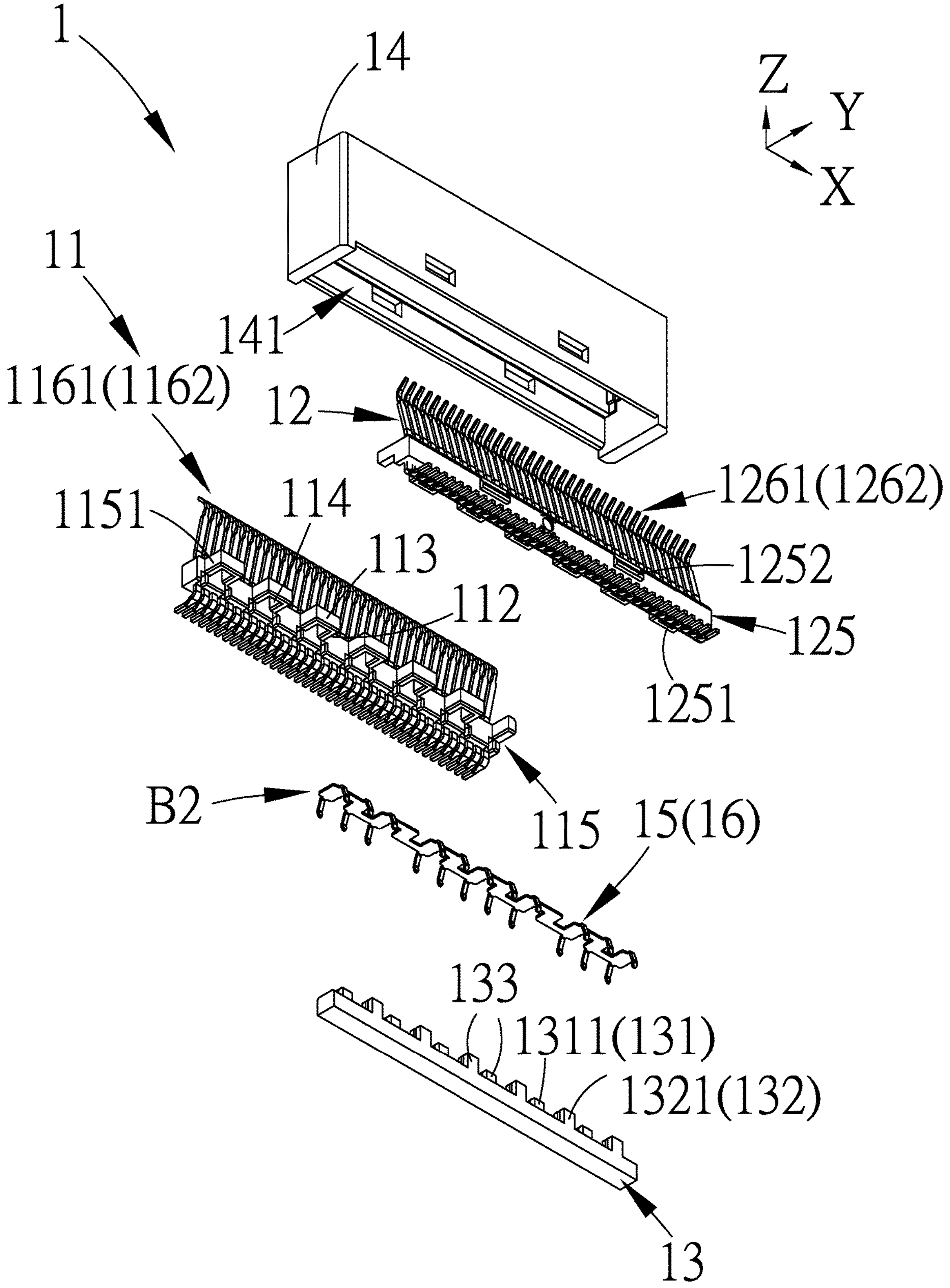
FIG. 5 is an exploded view schematic diagram showing preferred embodiment of a multi-piece connector according to the present invention.
Figure 6:
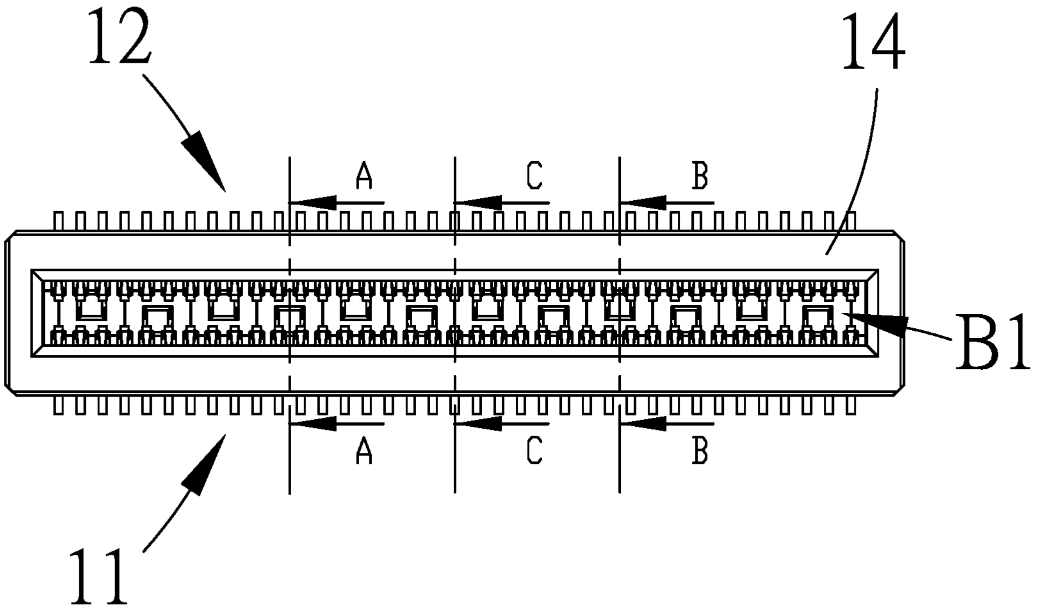
FIG. 6 is a top view schematic diagram showing preferred embodiment of a multi-piece connector according to the present invention.
Figure 7:
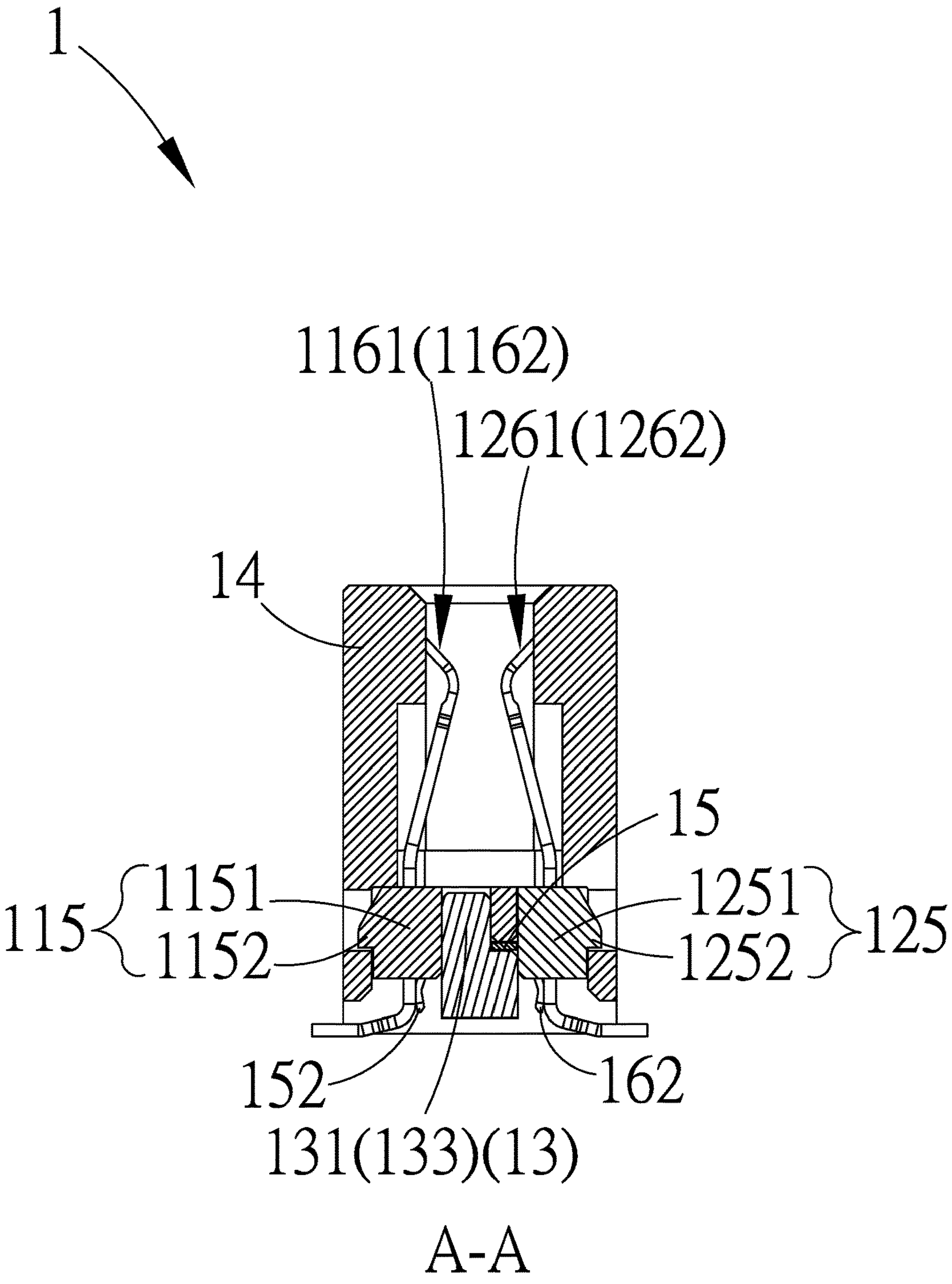
FIG. 7 is a cross-sectional schematic diagram showing the multi-piece connector in FIG. 6 cut along line AA.
Figure 8:
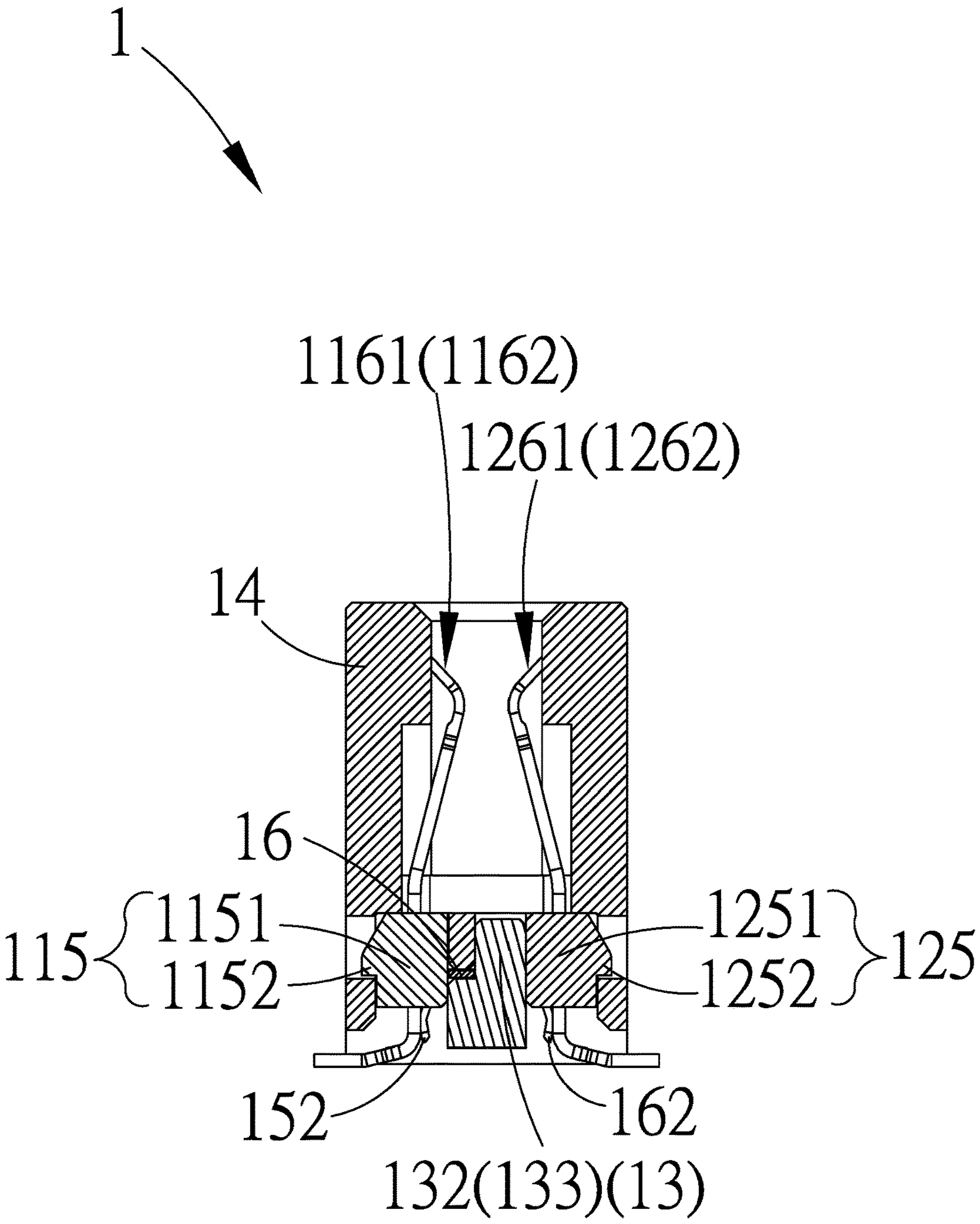
FIG. 8 is a cross-sectional schematic diagram showing the multi-piece connector in FIG. 6 cut along line BB.

In the above embodiments, the primary assembling sub-component 131 and the secondary assembling sub-component 132 can, but not limited to, be combined and integrally formed. Alternatively, as shown in FIG. 4, they are separate and individual components.

In the embodiments shown in FIGS. 3 to 5 and FIGS. 21 to 24, the primary connector sub-component 11 includes a primary plastic core 115, and the secondary connector sub-component 12 includes a secondary plastic core 125. In the above embodiments, the plastic casing 14 includes a receiving space 141 for accommodating the primary plastic core 115 and the secondary plastic core 125. Correspondingly, the primary plastic core 115 and the secondary plastic core 125 respectively are formed with a primary fastening structure 1152 and a secondary fastening structure 1252, each of which can be a hook. When the primary plastic core 115 and the secondary plastic core 125 are received in the receiving space 141 of the plastic casing 14, the primary fastening structure 1152 and the secondary fastening structure 1252 are fastened to the plastic casing 14 so as to position the primary plastic core 115 and the secondary plastic core 125 respectively and allow them to be firmly held in the plastic casing 14.

Moreover, the primary plastic core 115 and the secondary plastic core 125 respectively includes a primary fitting block 1151 and a secondary fitting block 1251, each of which can be a rectangular block. In the connector sub-component assembly B1, the primary fitting block 1151 and the secondary fitting block 1251 are assembled together to allow the primary assembling structure 111 to be fitted to the secondary assembling structure 121, thereby making the primary connector sub-component 11 and the secondary connector sub-component 12 assembled to form the connector sub-component assembly B1.

In the above embodiments, the primary fitting block 1151 of the primary connector sub-component 11 includes a primary X-direction assembling sub-structure 112, a primary Y-direction assembling sub-structure 113 and a primary Z-direction assembling sub-structure 114. The primary X-direction assembling sub-structure 112, the primary Y-direction assembling sub-structure 113 and the primary Z-direction assembling sub-structure 114 can be combined to form a rectangular hole.

In addition, the secondary fitting block 1251 of the secondary connector sub-component 12 includes a secondary X-direction assembling sub-structure 122, a secondary Y-direction assembling sub-structure 123 and a secondary Z-direction assembling sub-structure 124. The secondary X-direction assembling sub-structure 122, the secondary Y-direction assembling sub-structure 123 and the secondary Z-direction assembling sub-structure 124 can be combined to form a rectangular hole.

It should be noted that, in the connector sub-component assembly B1, as shown in FIGS. 21 to 24, the primary fitting block 1151 enters the secondary connector sub-component 12, making the primary X-direction assembling sub-structure 112 and the primary Y-direction assembling sub-structure 113 be attached to the secondary connector sub-component 12 in X direction and Y direction respectively; furthermore, the secondary fitting block 1251 enters the primary connector sub-component 11, making the secondary X-direction assembling sub-structure 122 and the secondary Y-direction assembling sub-structure 123 be attached to the primary connector sub-component 11 in X direction and Y direction respectively. This thus allows the primary connector sub-component 11 and the secondary connector sub-component 12 to be assembled to form the connector sub-component assembly B1. As shown in FIGS. 12 to 17, the assembling component 13 is fitted in Z direction to the primary Z-direction assembling sub-structure 114 and the secondary Z-direction assembling sub-structure 124 respectively, such that the primary connector sub-component 11 and the secondary connector sub-component 12 are assembled together by the assembling component 13 to form the connector sub-component assembly B1.

In the above embodiments, said X direction, said Y direction and said Z direction are vertical to each other. In the connector sub-component assembly B1, the primary Z-direction assembling sub-structure 114 and the secondary Z-direction assembling sub-structure 124 can each be a socket structure, and correspondingly, the assembling component 13 has a plug structure 133 for being plugged into the primary Z-direction assembling sub-structure 114 and the secondary Z-direction assembling sub-structure 124 to firmly assemble the primary connector sub-component 11 with the secondary connector sub-component 12. The present invention is however not limited to this configuration. Alternatively, for example, the primary connector sub-component 11 and the secondary connector sub-component 12 can be assembled by adhesion or fastening, without using the assembling component 13. Further in the connector sub-component assembly B1, the primary Z-direction assembling sub-structure 114 and the secondary Z-direction assembling sub-structure 124 can be aligned in a row to reduce thickness of the assembling component 13, thereby helping minimize the size of the multi-piece connector in the present invention and making it suitable for use in a low profile electronic device.

In the embodiments shown in FIGS. 7 to 9 and FIG. 27, the primary connector sub-component 11 is provided with a primary first conductive terminal 1161 and a plurality of primary second conductive terminals 1162, for transmitting conductive signals or grounding signals. The primary jumper conductor 15 goes over the primary first conductive terminal 1161 to abut each of the primary second conductive terminals 1162 so as to allow the primary second conductive terminals 1162 to be electrically interconnected to form a primary second conducive circuit. Furthermore, the secondary connector sub-component 12 is provided with a secondary first conductive terminal 1261 and a plurality of secondary second conductive terminals 1262, for transmitting conductive signals or grounding signals. The secondary jumper conductor 16 goes over the secondary first conductive terminal 1261 to abut each of the secondary second conductive terminals 1262 so as to allow the secondary second conductive terminals 1262 to be electrically interconnected to form a secondary second conducive circuit.

It should be noted that, the primary second conducive circuit and the secondary second conducive circuit can respectively be used for transmitting grounding signals if needed according to customized requirements for the connector. Therefore, the present invention simply utilizes the primary jumper conductor or the secondary jumper conductor to form electrical connection between parts of conductive terminals of the connector, with no need of any additional jumper, such that the electronic device using the multi-piece connector in the present invention can be made more compact in size.

In the embodiment shown in FIG. 4, the primary jumper conductor 15 includes a primary jumper conductor body 151 and a plurality of primary jumper conductor elastic arms 152. The primary jumper conductor body 151 is connected to each of the primary jumper conductor elastic arms 152, and each of the primary jumper conductor elastic arms 152 abuts one of the plurality of primary second conductive terminals 1162 to assure the primary jumper conductor 15 to abut each of the primary second conductive terminals 1162, making the primary jumper conductor body 151 able to be positioned.

Moreover, the secondary jumper conductor 16 includes a secondary jumper conductor body 161 and a plurality of secondary jumper conductor elastic arms 162. The secondary jumper conductor body 161 is connected to each of the secondary jumper conductor elastic arms 162, and each of the secondary jumper conductor elastic arms 162 abuts one of the plurality of secondary second conductive terminals 1262 to assure the secondary jumper conductor 16 to abut each of the secondary second conductive terminals 1262, making the secondary jumper conductor body 161 able to be positioned.

Figure 3:
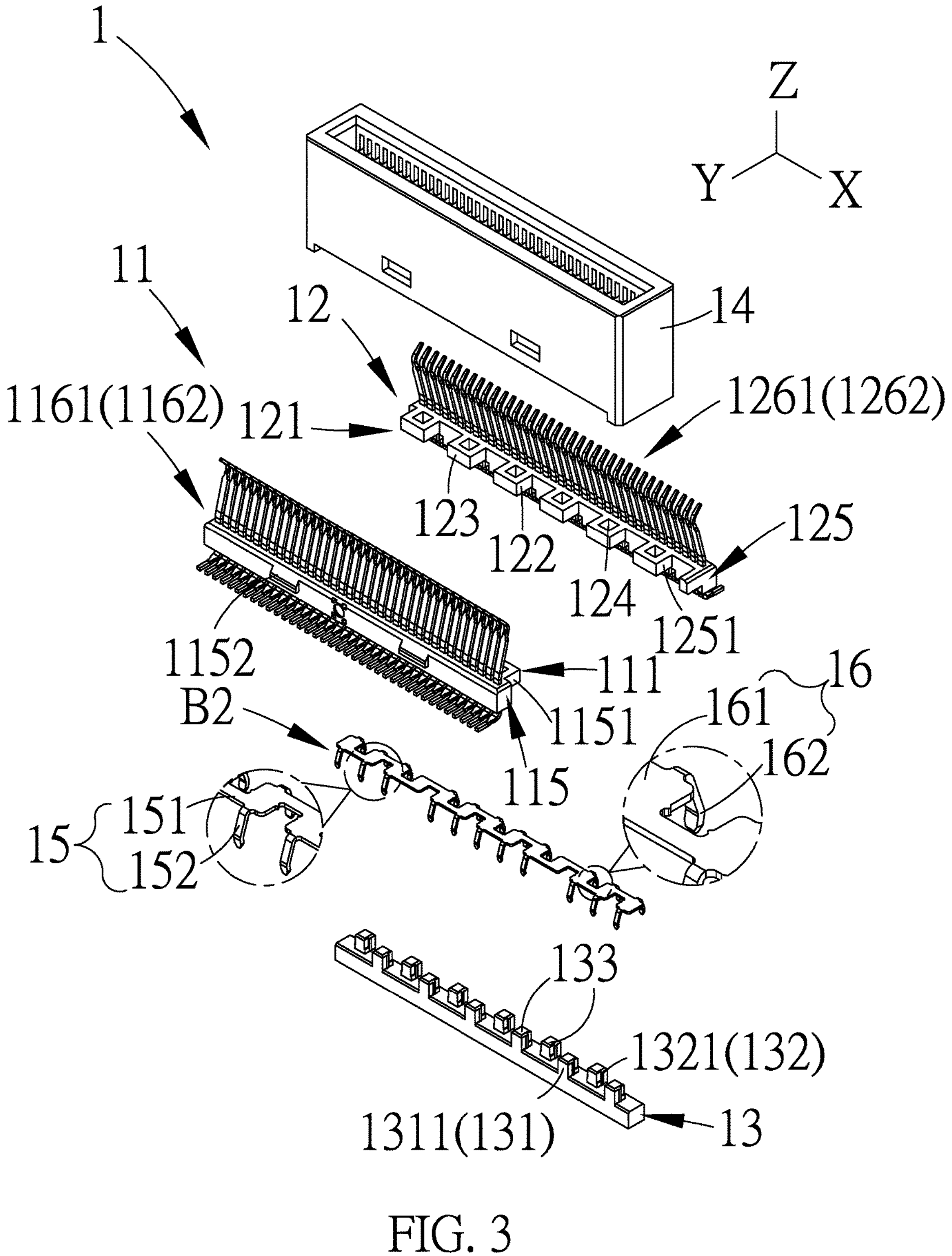
FIG. 3 is an exploded view schematic diagram showing preferred embodiment of a multi-piece connector according to the present invention.

In the embodiment shown in FIG. 3, the primary jumper conductor body 151 is connected to the secondary jumper conductor body 161 to allow the primary jumper conductor 15 and the secondary jumper conductor 16 to be integrally formed and become a jumper conductor assembly B2 in which the primary second conductive circuit is electrically connected to the secondary second conductive circuit. For example, the jumper conductor assembly B2 can be formed by cutting and bending a metallic conductor board. Moreover, the assembling component 13 is attached to the jumper conductor assembly B2 in Z direction to combine the jumper conductor assembly B2 and the connector sub-component assembly B1 together, such that the thickness of the assembling component 13 and thus the size of the multi-piece connector in the present invention can be reduced, thereby making the electronic device having the multi-piece connector be made more compact in size.

Figure 9:
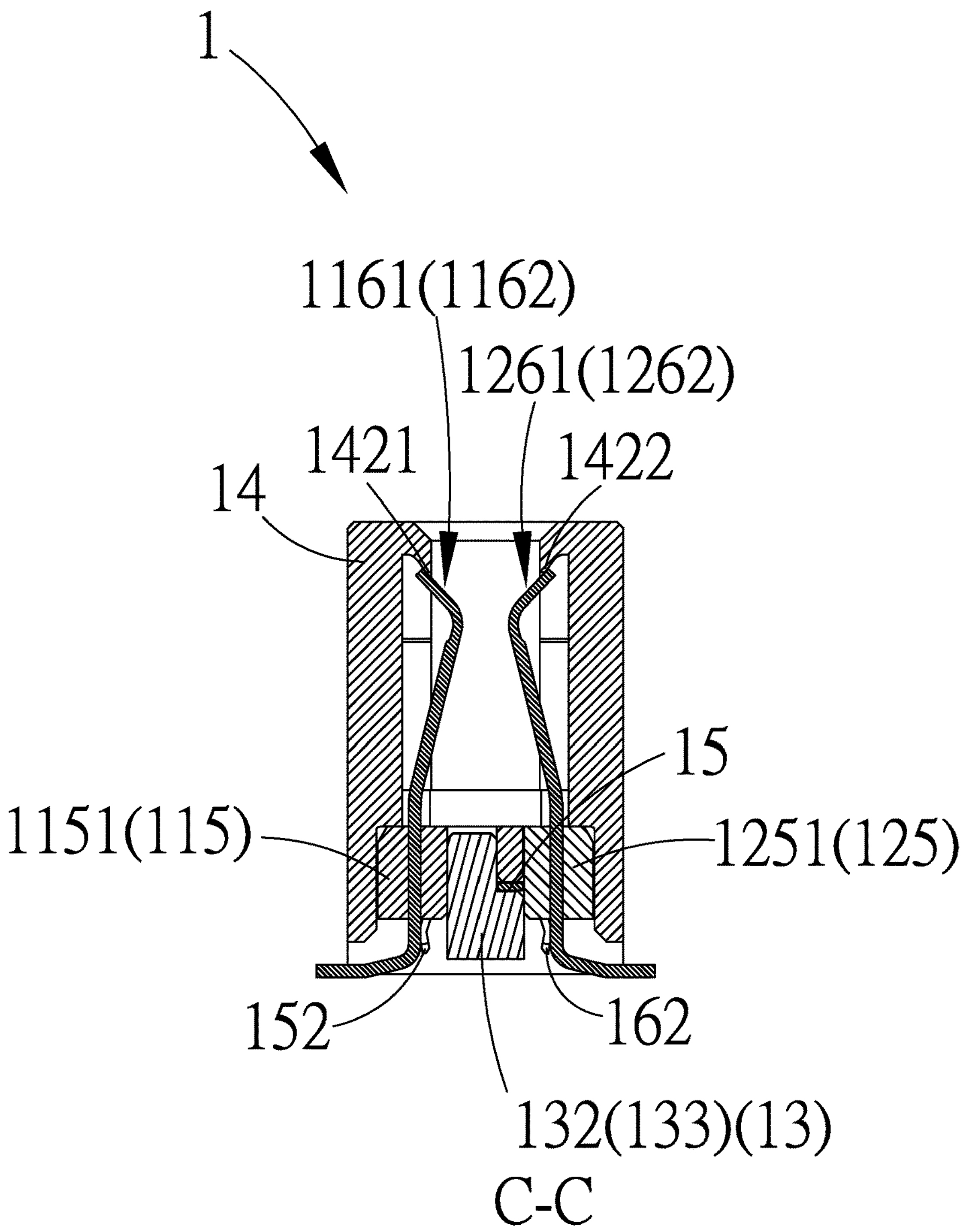
FIG. 9 is a cross-sectional schematic diagram showing the multi-piece connector in FIG. 6 cut along line CC.
Figure 10:
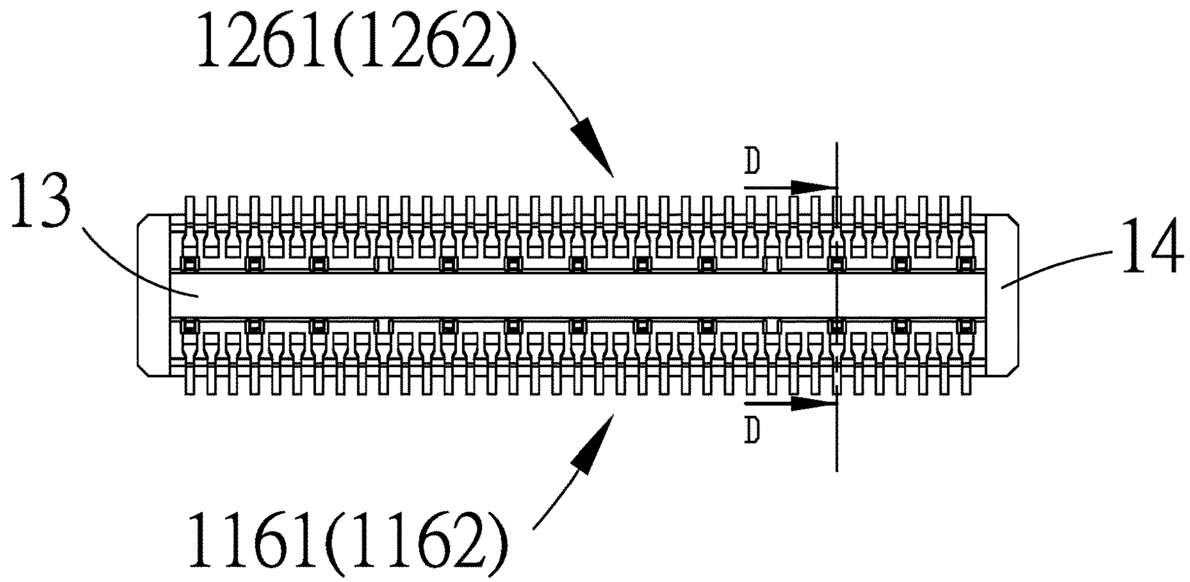
FIG. 10 is a bottom view schematic diagram showing preferred embodiment of a multi-piece connector according to the present invention.
Figure 11:
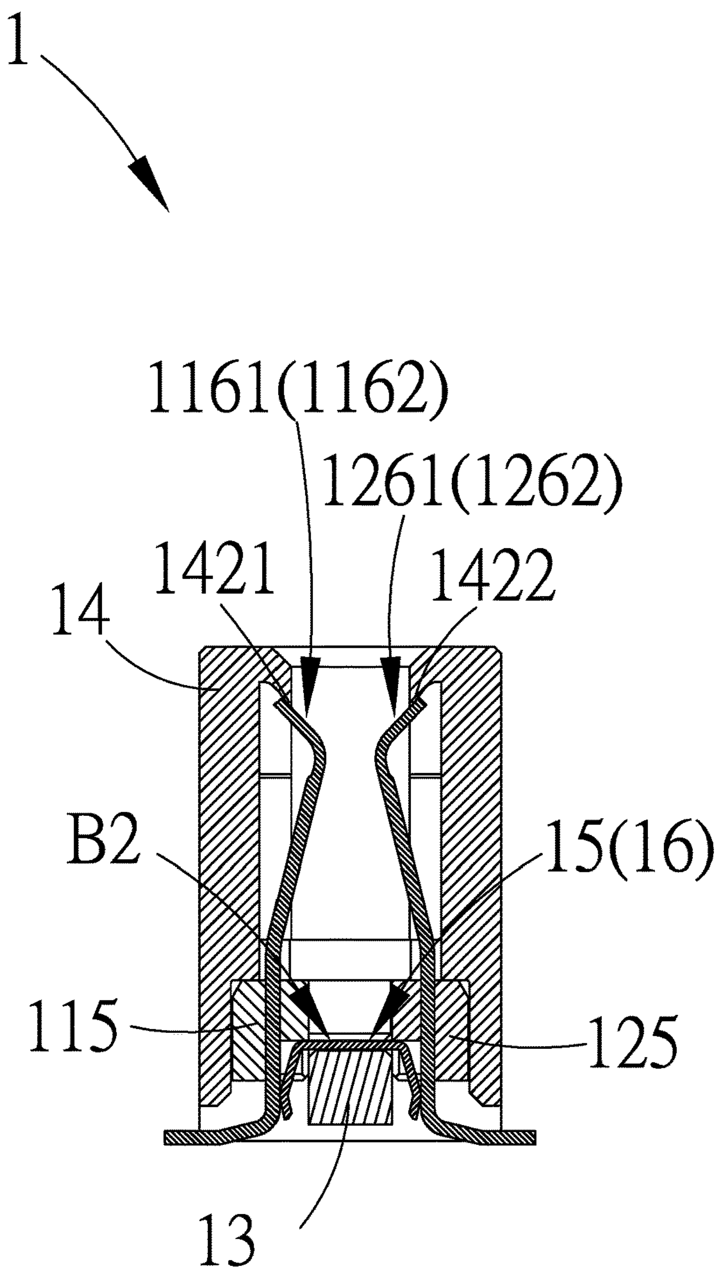
FIG. 11 is a cross-sectional schematic diagram showing the multi-piece connector in FIG. 10 cut along line DD.
Figure 12:
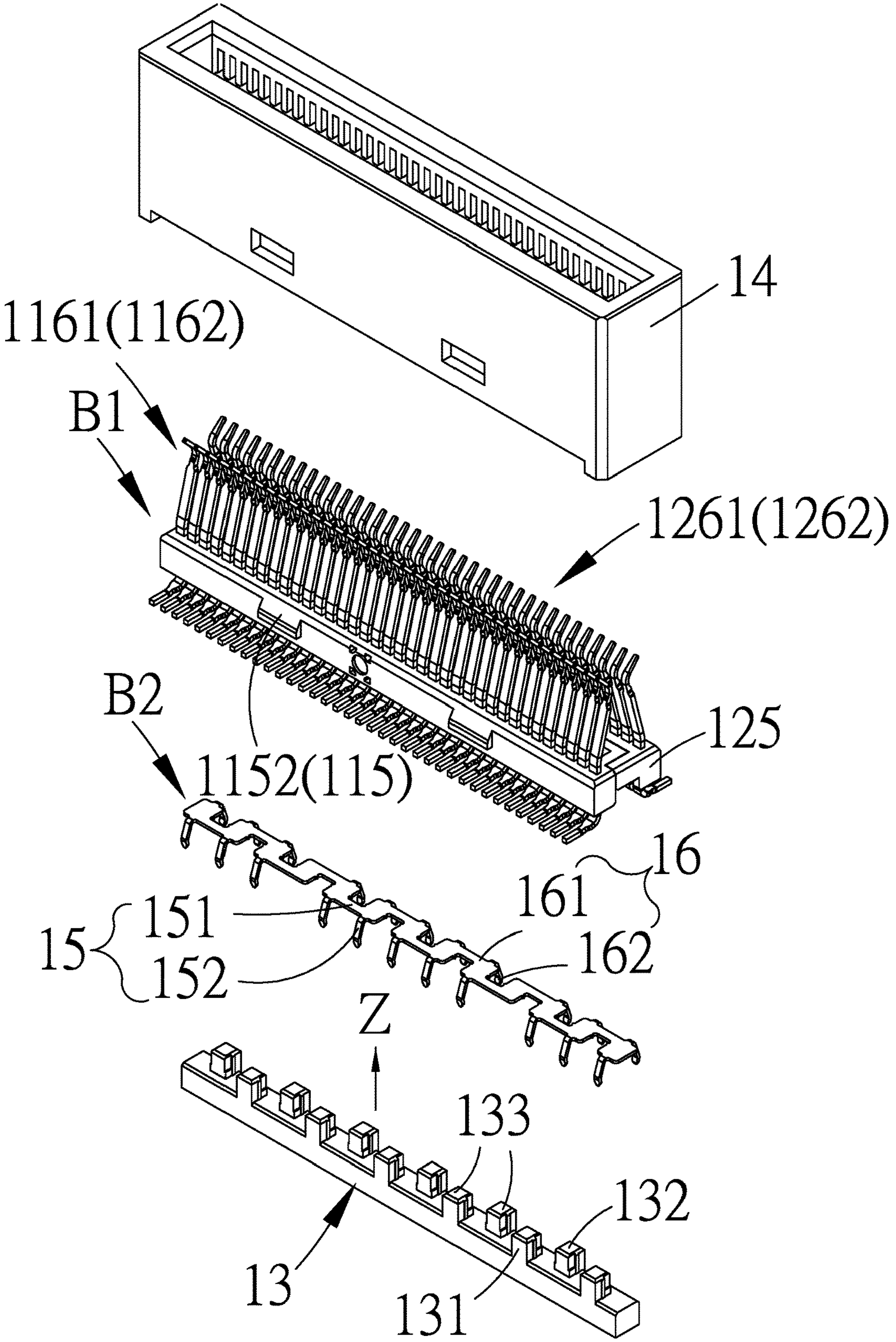
FIG. 12 is an assembly view schematic diagram showing preferred embodiment of a multi-piece connector according to the present invention.
Figure 13:
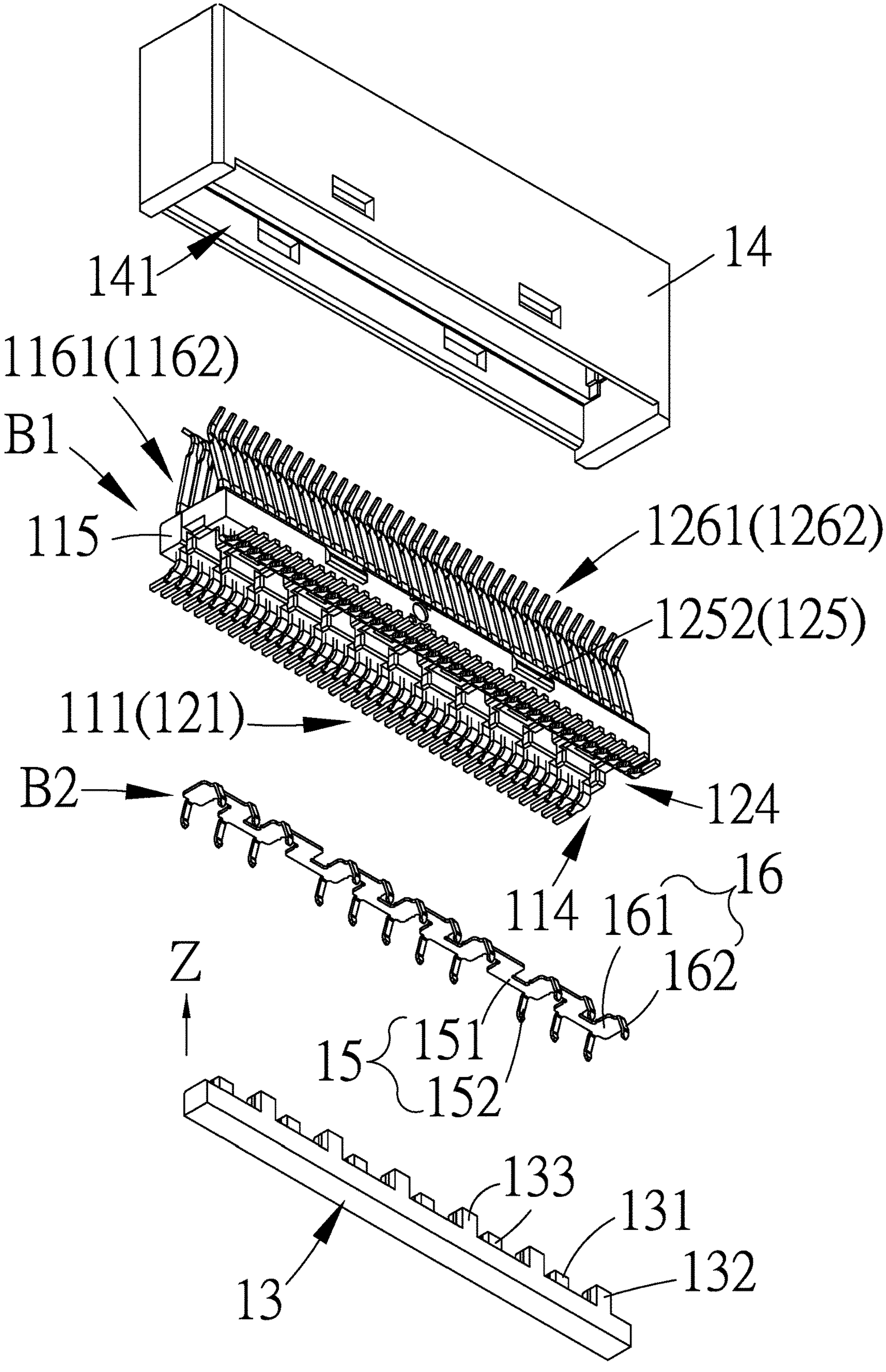
FIG. 13 is an assembly view schematic diagram showing preferred embodiment of a multi-piece connector according to the present invention.
Figure 14:
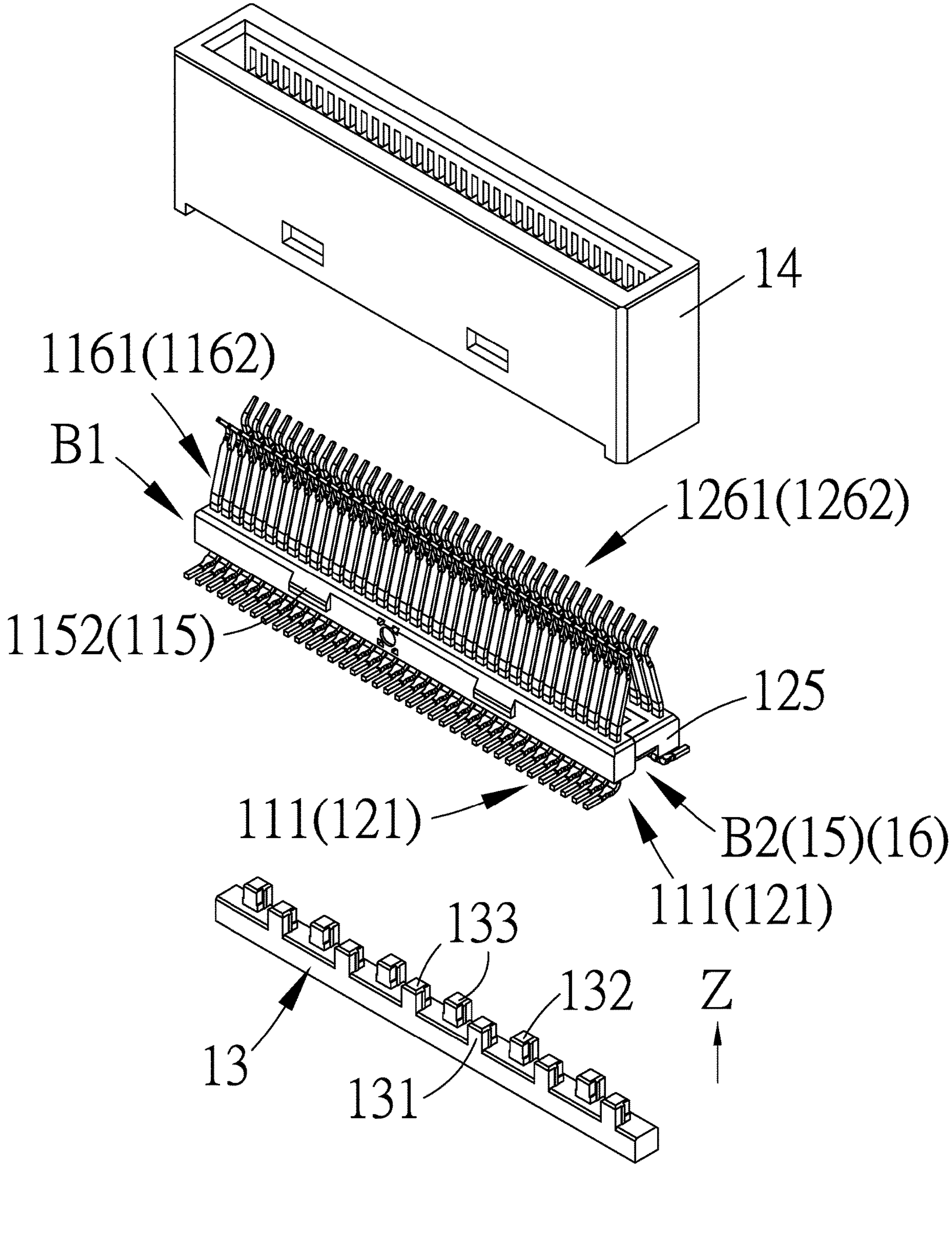
FIG. 14 is an assembly view schematic diagram showing preferred embodiment of a multi-piece connector according to the present invention.
Figure 15:
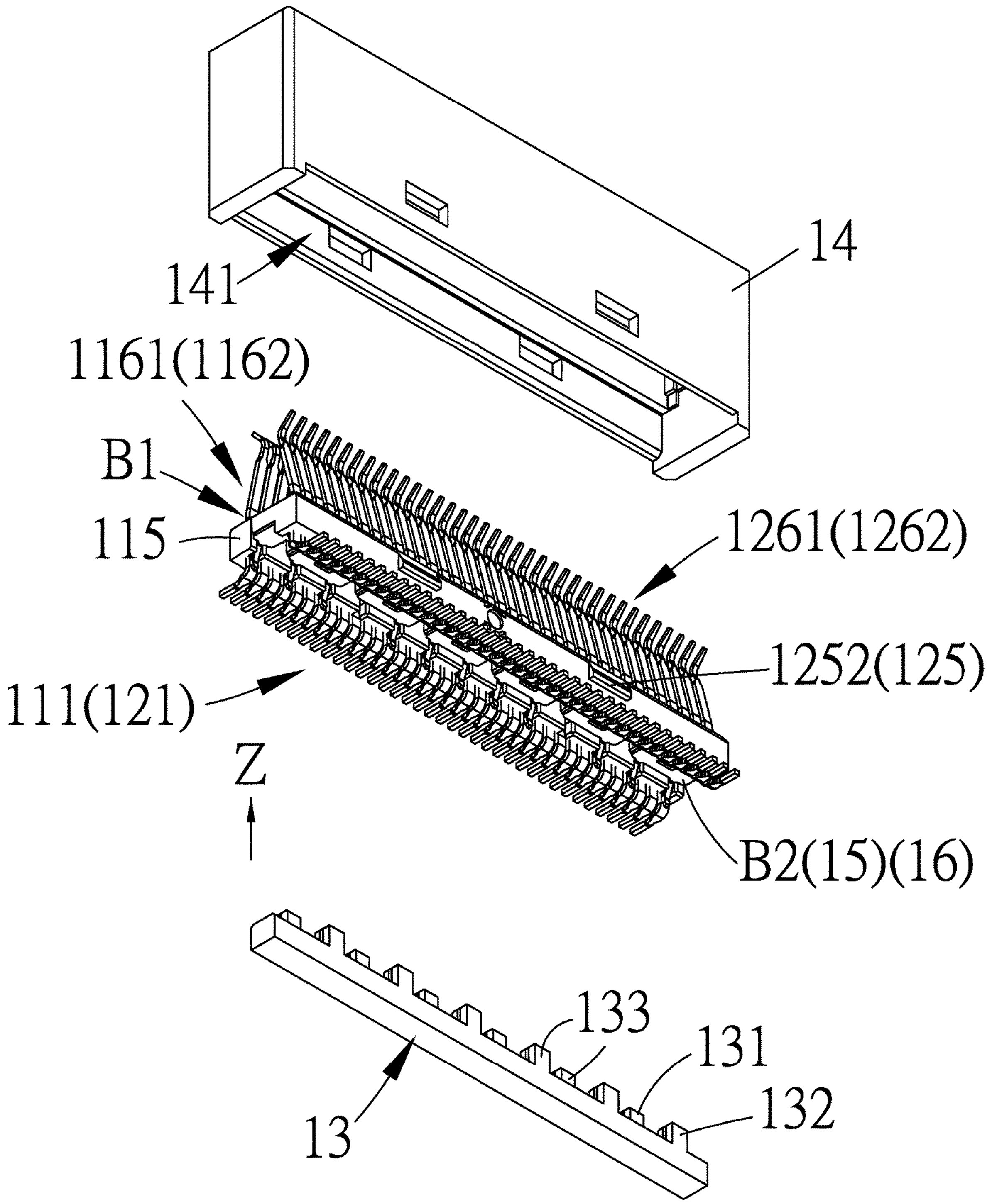
FIG. 15 is an assembly view schematic diagram showing preferred embodiment of a multi-piece connector according to the present invention.
Figure 16:
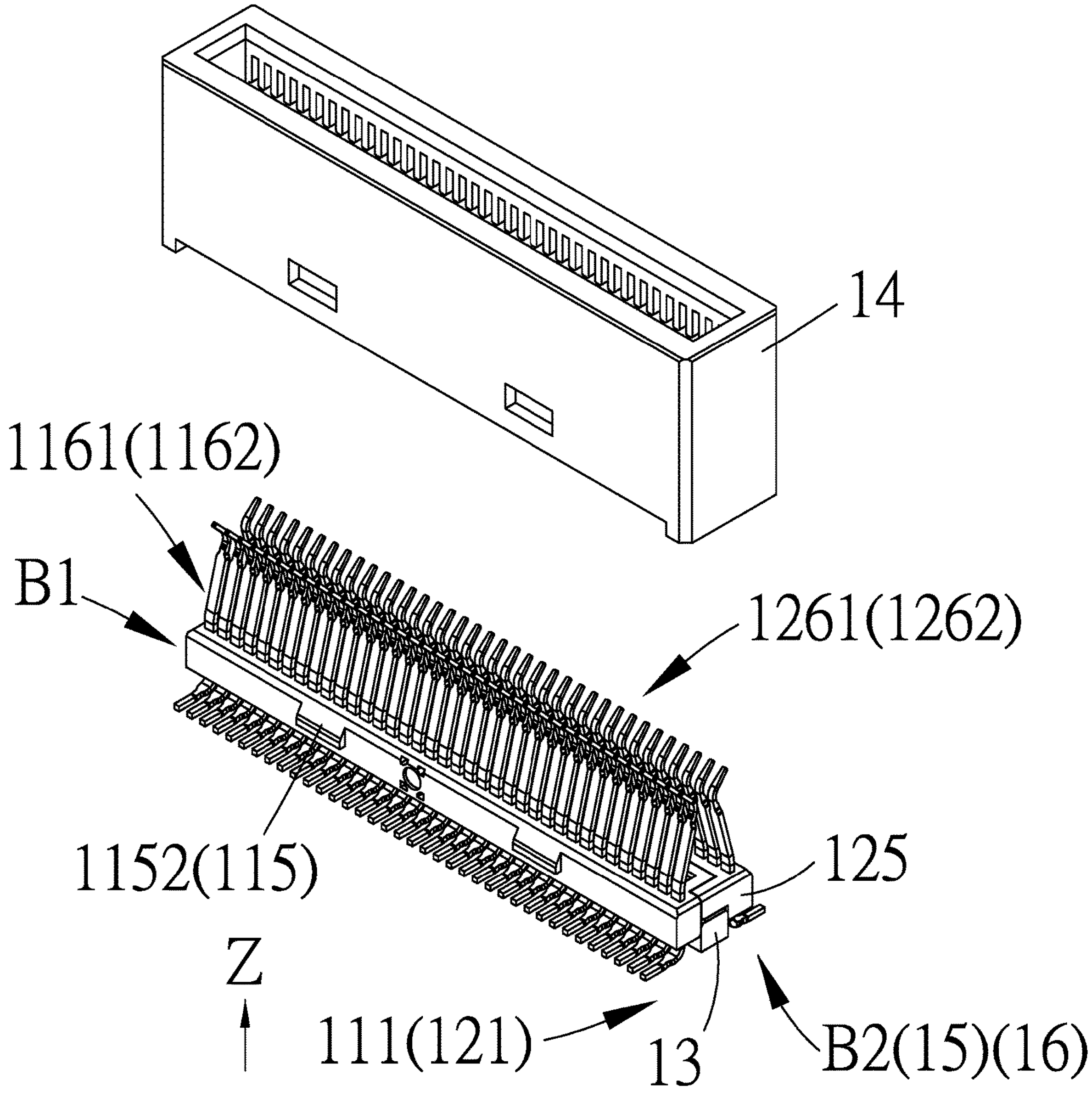
FIG. 16 is an assembly view schematic diagram showing preferred embodiment of a multi-piece connector according to the present invention.
Figure 17:
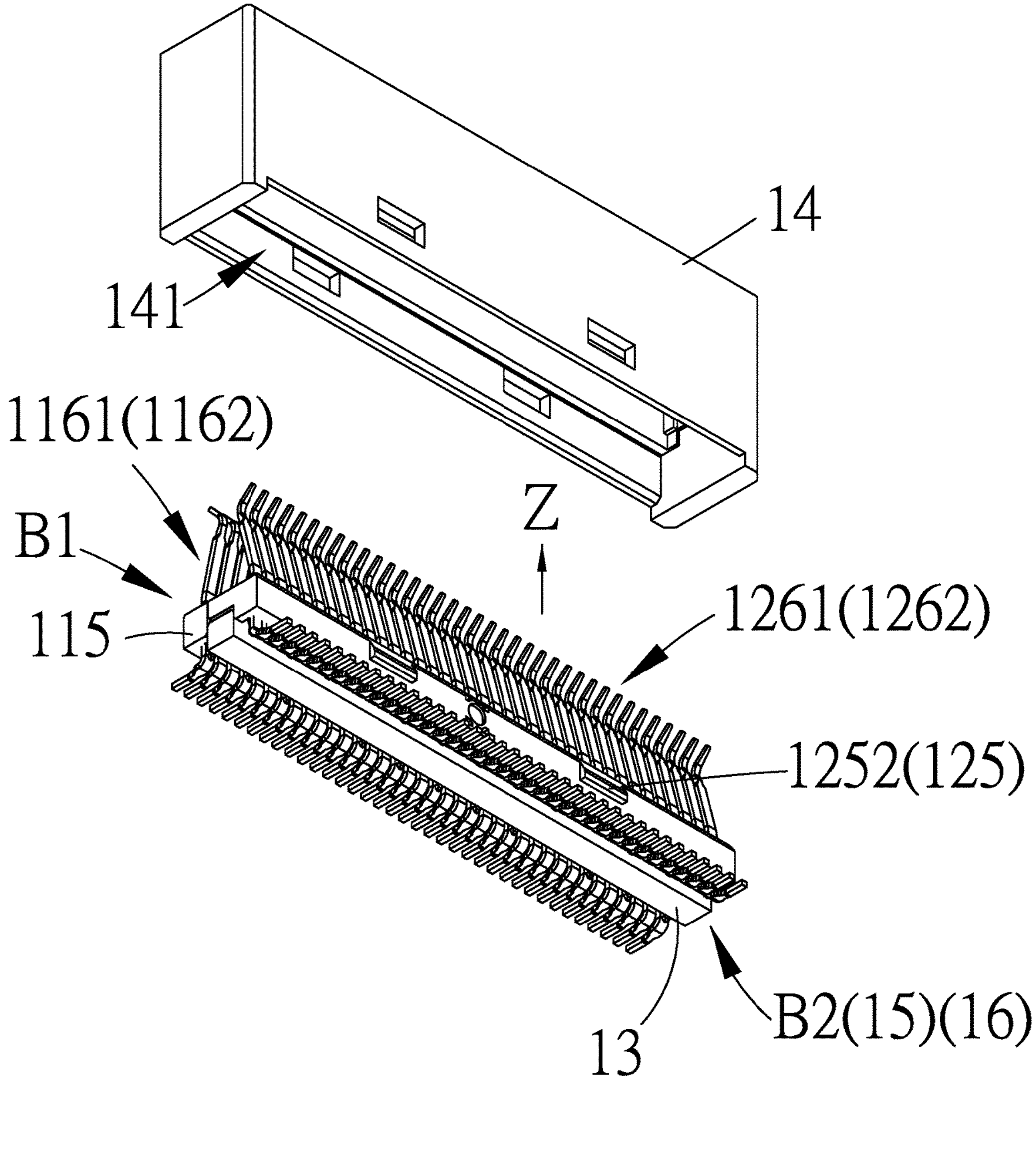
FIG. 17 is an assembly view schematic diagram showing preferred embodiment of a multi-piece connector according to the present invention.
Figure 18:
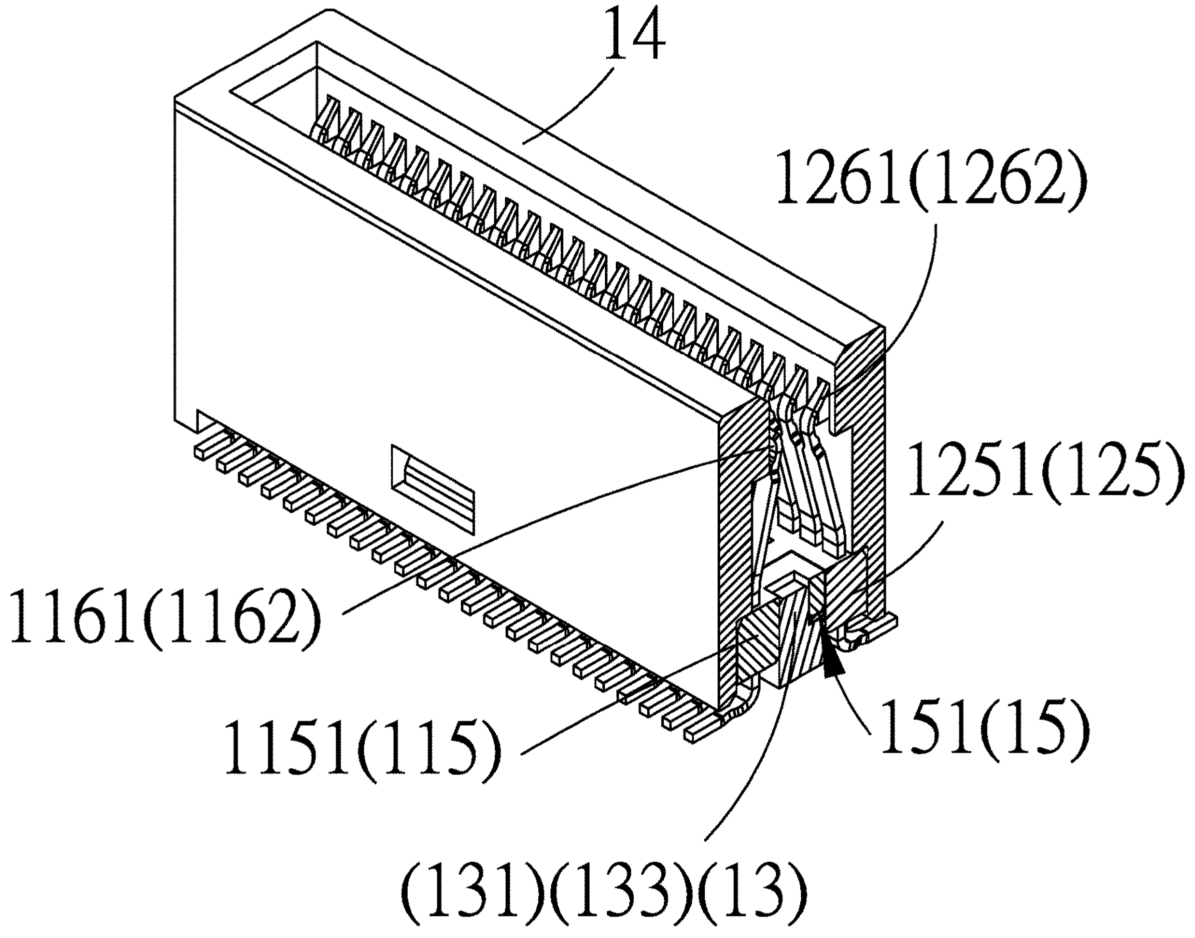
FIG. 18 is a cross-sectional schematic diagram showing preferred embodiment of a multi-piece connector according to the present invention.
Figure 19:
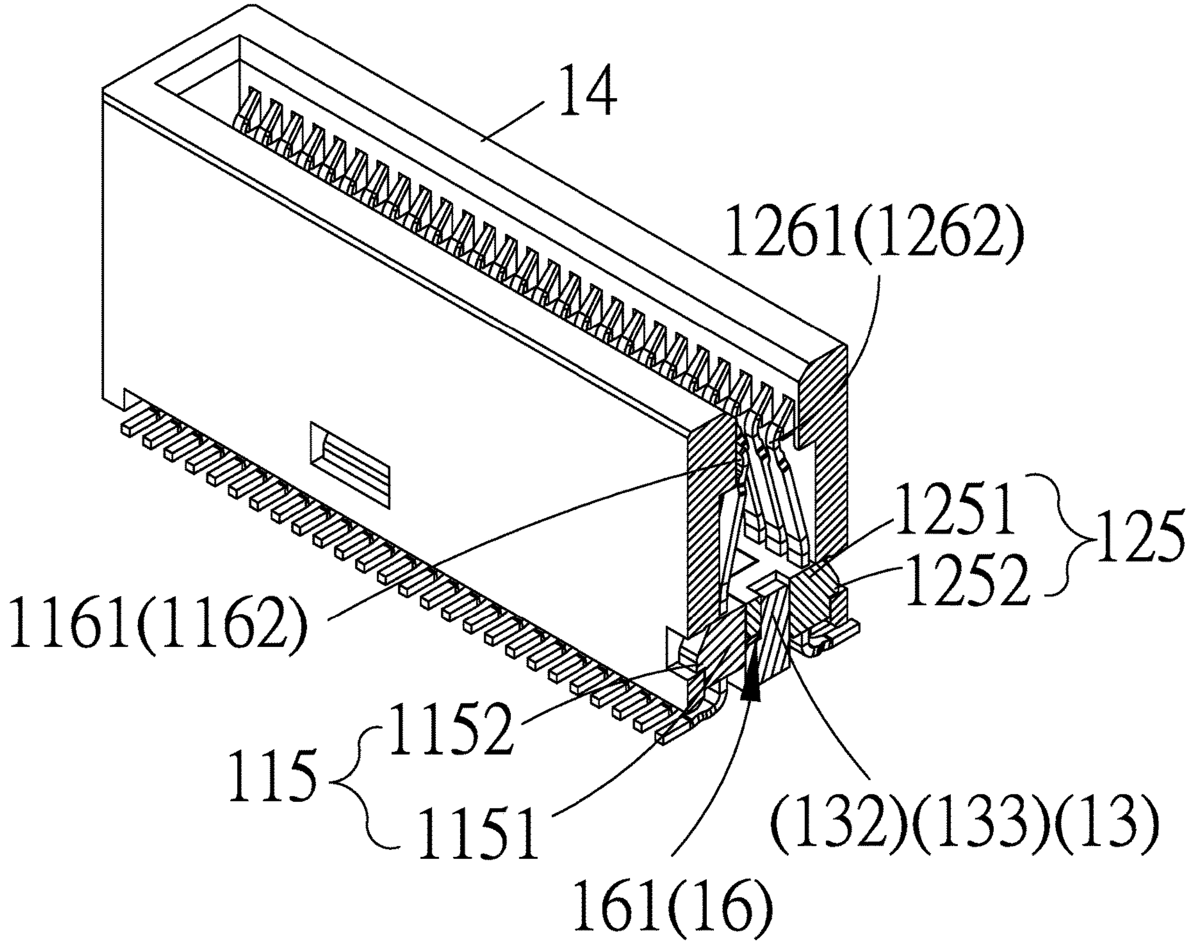
FIG. 19 is a cross-sectional schematic diagram showing preferred embodiment of a multi-piece connector according to the present invention.
Figure 20:
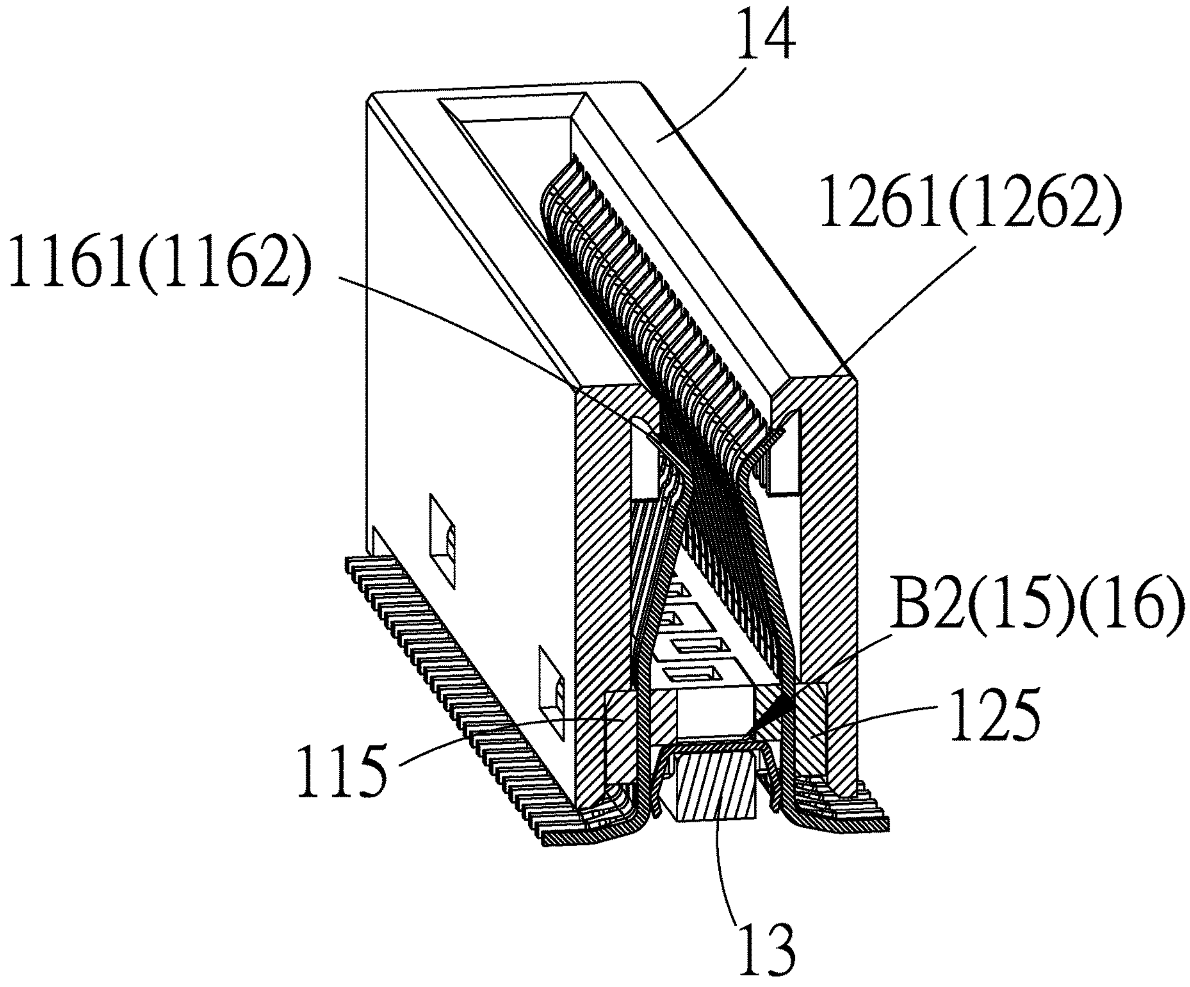
FIG. 20 is a cross-sectional schematic diagram showing preferred embodiment of a multi-piece connector according to the present invention.
Figure 21:
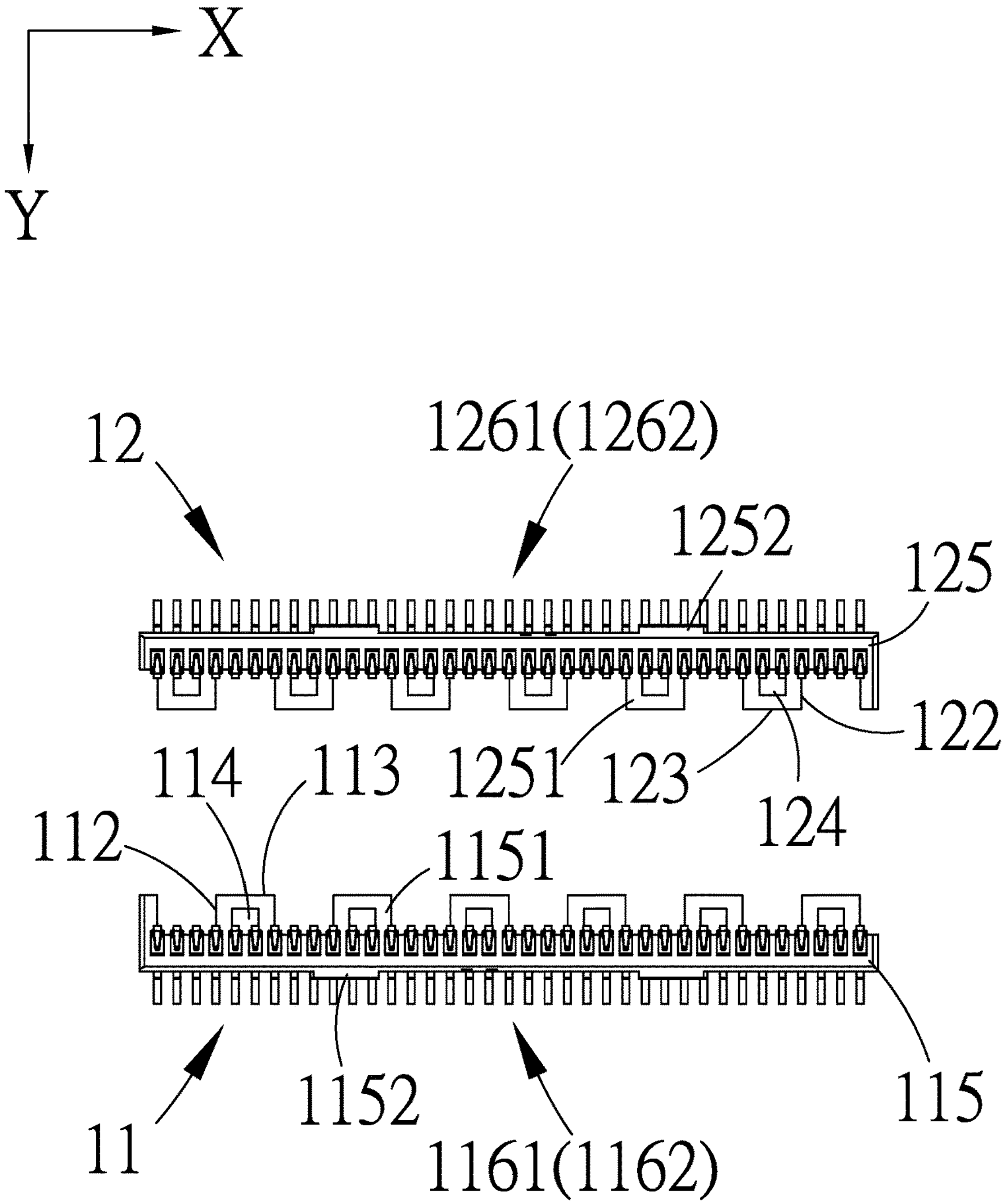
FIG. 21 is an assembly view schematic diagram showing preferred embodiment of a multi-piece connector according to the present invention.
Figure 22:
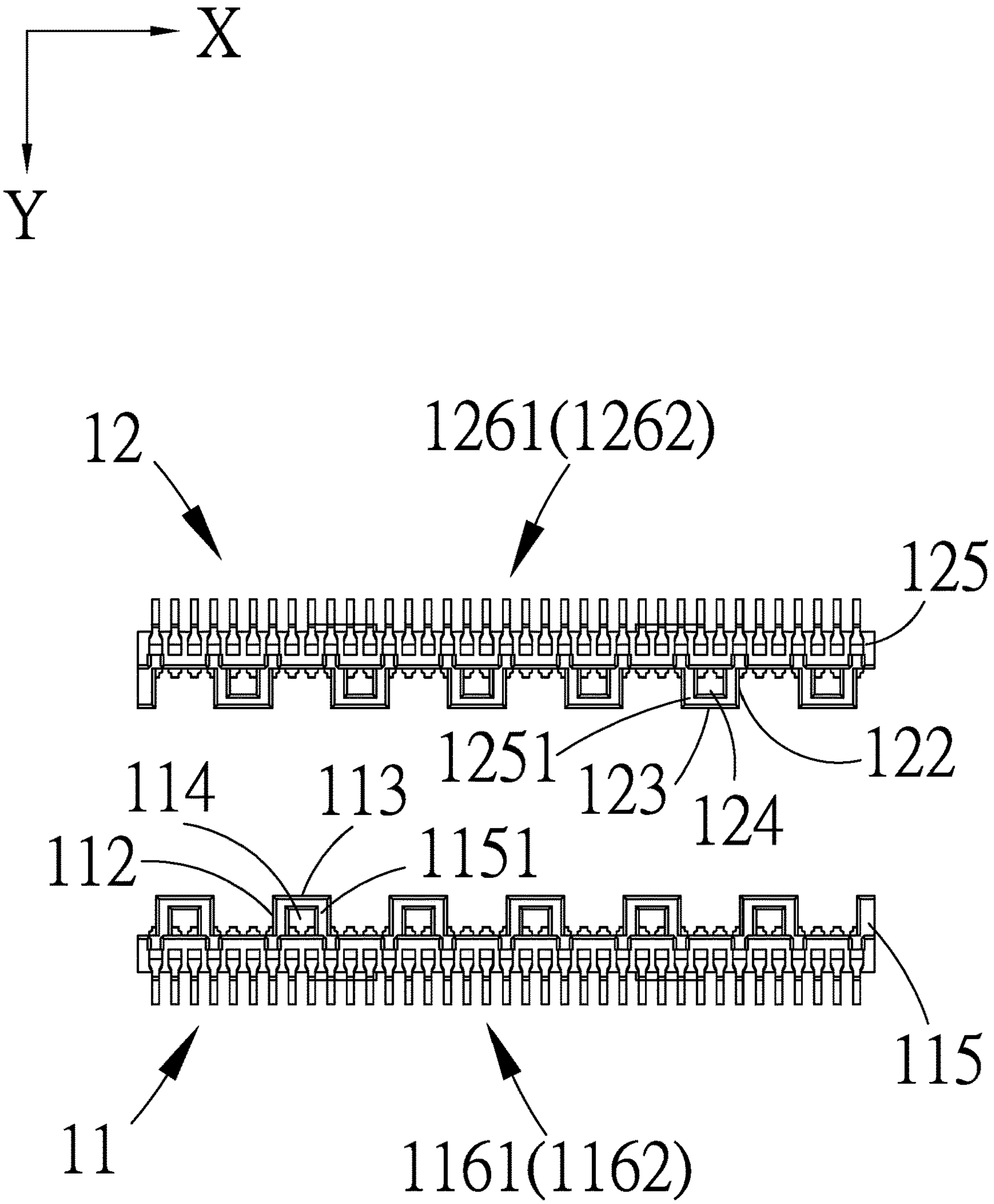
FIG. 22 is an assembly view schematic diagram showing preferred embodiment of a multi-piece connector according to the present invention.
Figure 23:
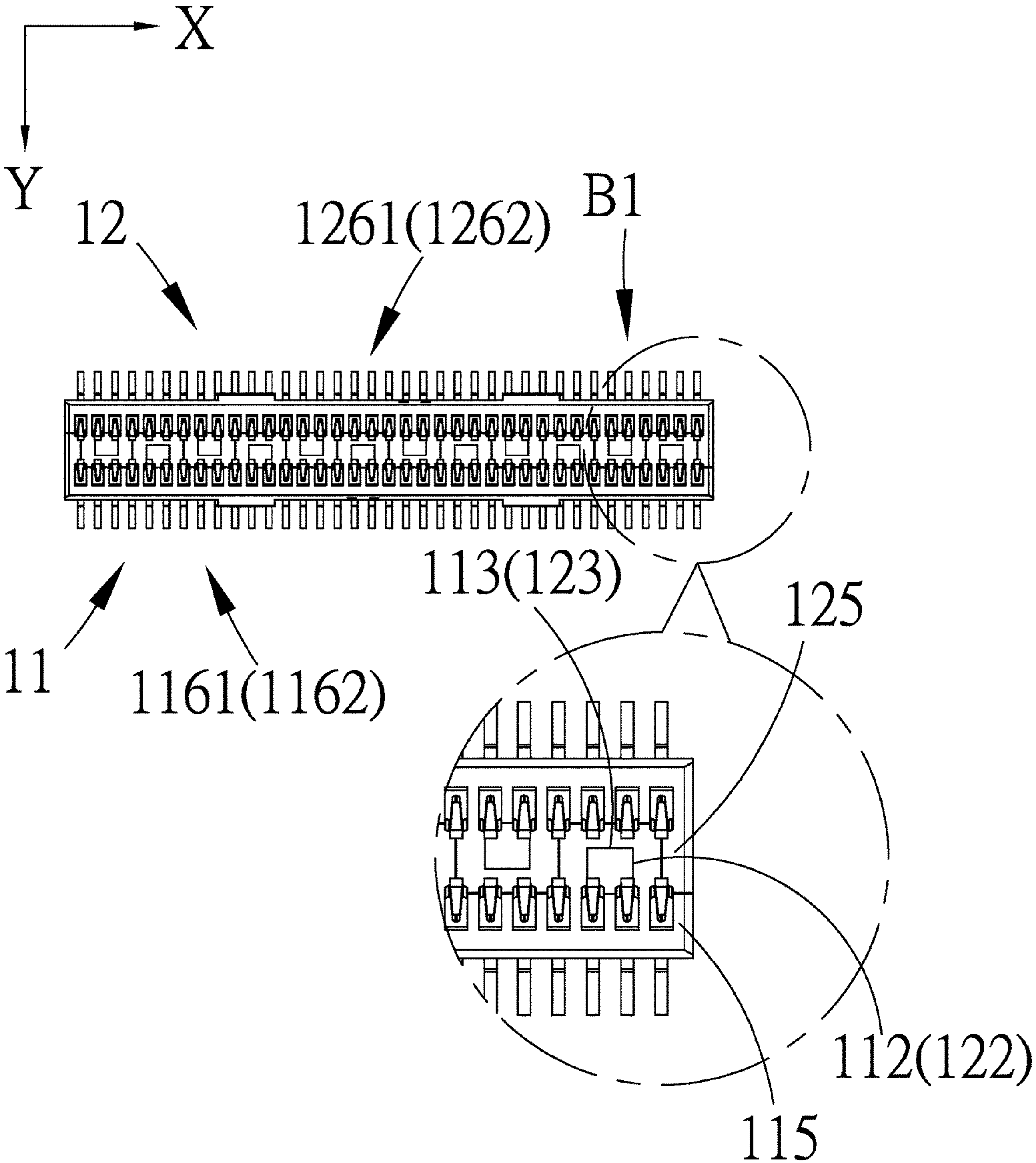
FIG. 23 is an assembly view schematic diagram showing preferred embodiment of a multi-piece connector according to the present invention.
Figure 24:
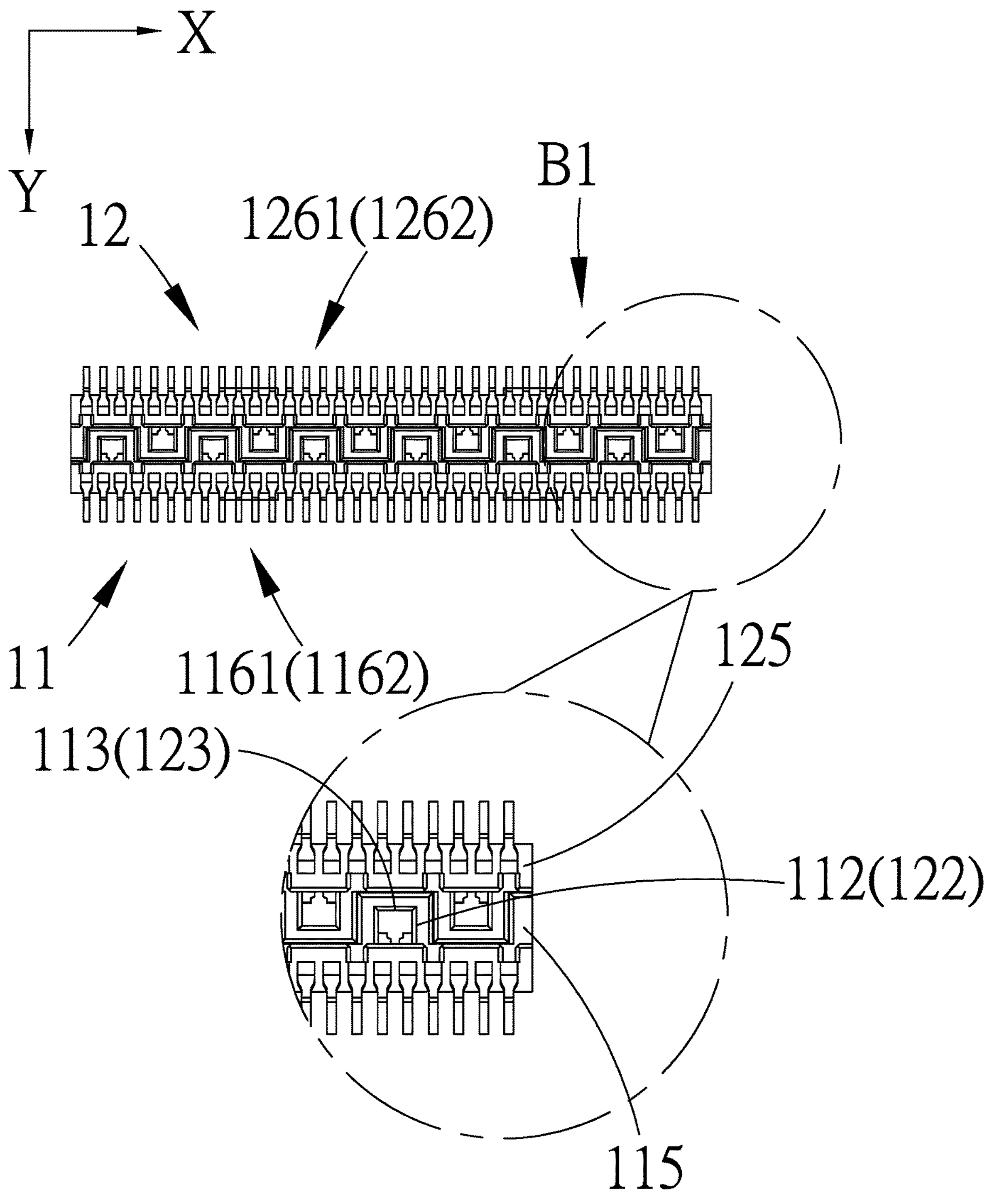
FIG. 24 is a cross-sectional schematic diagram showing preferred embodiment of a multi-piece connector according to the present invention.
Figure 25:
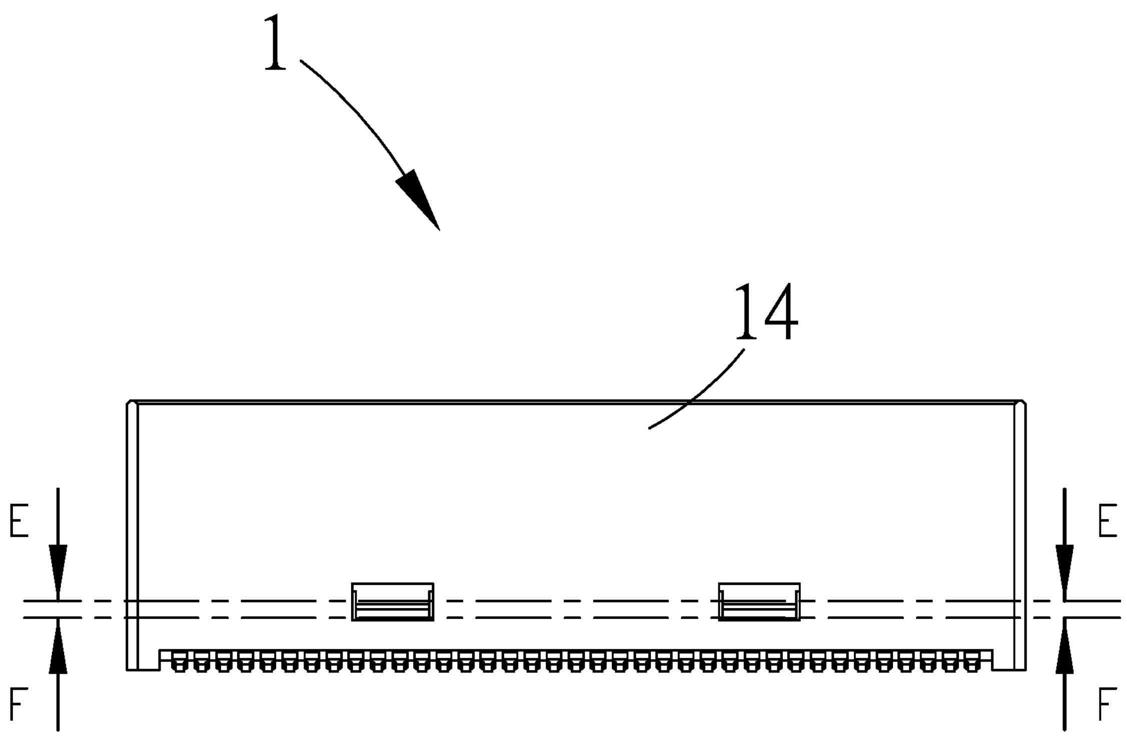
FIG. 25 is a side view schematic diagram showing preferred embodiment of a multi-piece connector according to the present invention.
Figure 26:
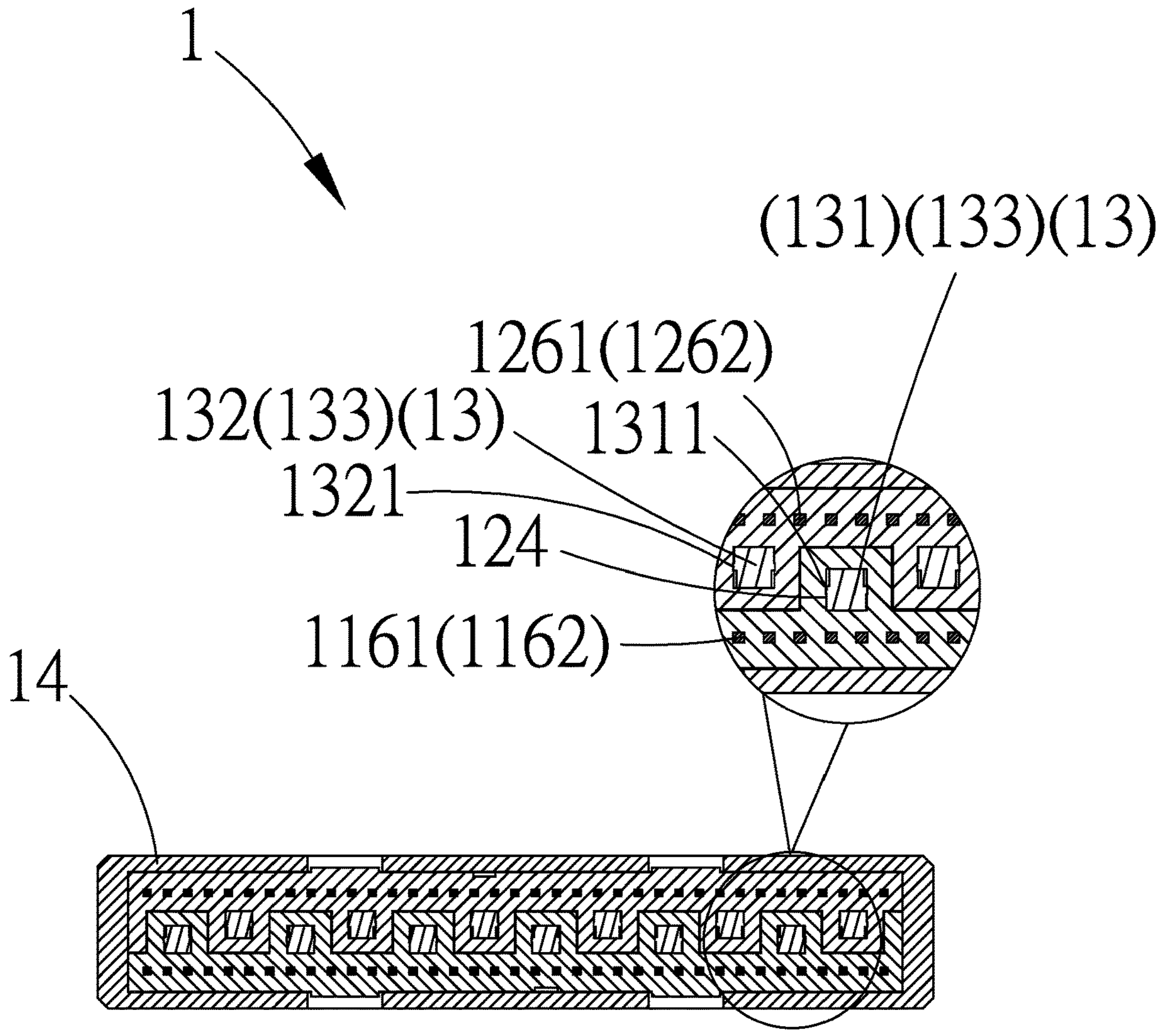
FIG. 26 is a cross-sectional schematic diagram showing the multi-piece connector in FIG. 25 cut along line EE.

It should be noted that, in the above embodiment shown in FIG. 9, the plastic casing 14 includes a primary abutting structure 1421 and a secondary abutting structure 1422. The primary abutting structure 1421 is used to abut and position the primary first conductive terminal 1161 and the primary second conductive terminals 1162 to prevent them from undesirable or excessive deformation. The secondary abutting structure 1422 is used to abut and position the secondary first conductive terminal 1261 and the secondary second conductive terminals 1262 to prevent them from undesirable or excessive deformation.

Figure 27:
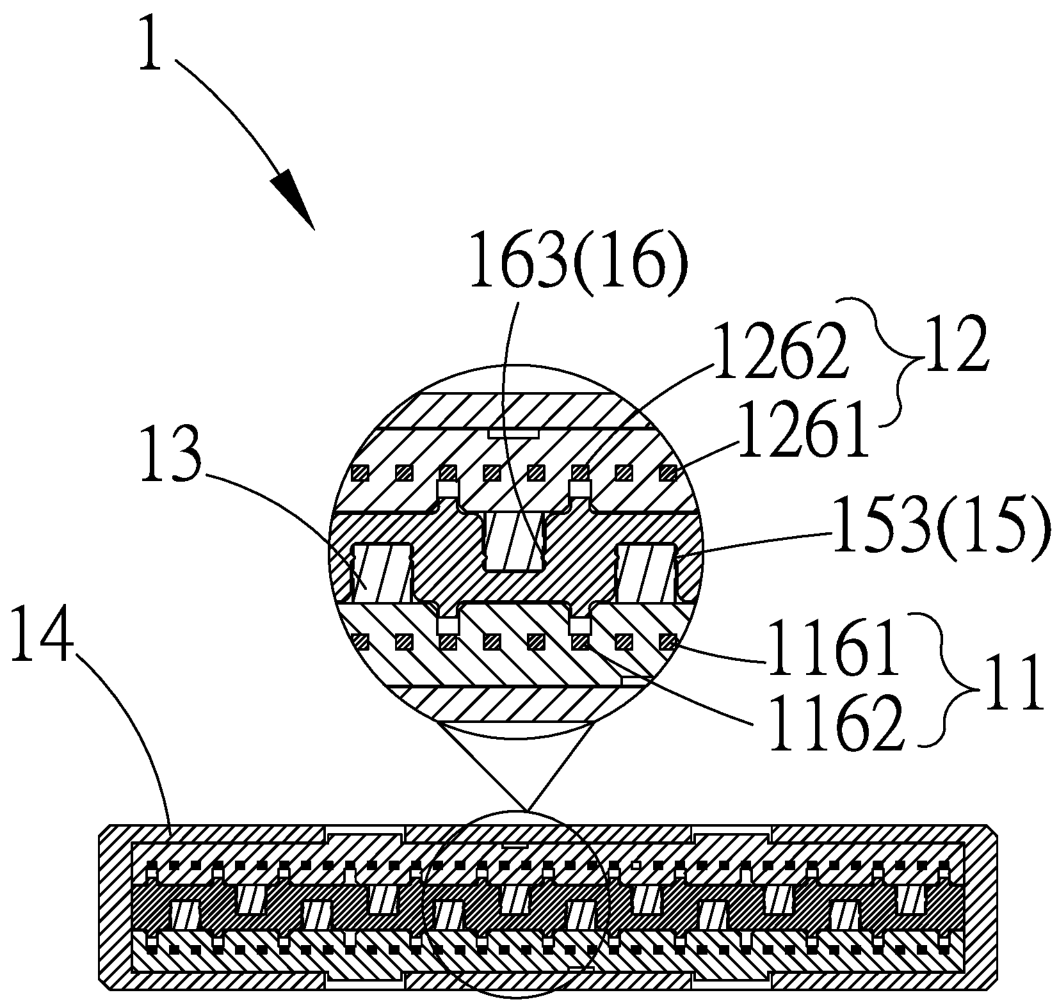
FIG. 27 is a cross-sectional schematic diagram showing the multi-piece connector in FIG. 25 cut along line FF.

Moreover, in the embodiment shown in FIG. 27, the primary jumper conductor 15 includes a primary jumper conductor interference structure 153, and the secondary jumper conductor 16 includes a secondary jumper conductor interference structure 163. The primary jumper conductor interference structure 153 and the secondary jumper conductor interference structure 163 respectively interfere with fitting to the assembling component 13 so as to prevent the primary jumper conductor 15 and the secondary jumper conductor 16 from being easily detached from the assembling component 13 by a force.

Furthermore, the multi-piece connector 1 can be formed by using the assembling component 13 to assemble the primary connector sub-component 11 and the secondary connector sub-component 12 to the plastic casing 14. Thus, even if the connector is finished, the number and structure of conductive terminals for the connector can still be modified and customized by adjusting the primary connector sub-component 11 and the secondary connector sub-component 12 in response to development requirements for the electronic device.

It should be noted that, in the embodiments of the present invention, some components can selectively be omitted such as the plastic casing, the primary jumper conductor and the secondary jumper conductor. In other words, the multi-piece connector includes: the primary connector sub-component, the secondary connector sub-component and the assembling component.

The primary connector sub-component includes a primary assembling structure. The secondary connector sub-component includes a secondary assembling structure. The assembling component is respectively fitted to the primary assembling structure and the secondary assembling structure to assemble the primary connector sub-component with the secondary connector sub-component to form a connector sub-component assembly. Thus, even if the connector is finished, the number and structure of conductive terminals of the connector can still be modified and customized by adjusting the primary connector sub-component and the secondary connector sub-component.

In summary, the present invention provides a multi-piece connector, which includes a jumper conductor for electrically interconnecting parts of conductive terminals of the connector, without having to use any additional jumper, such that an electronic device having such a connector can be made more compact in size.

Moreover, the multi-piece connector in the present invention is formed by using an assembling component to assemble a primary connector sub-component and a secondary connector sub-component to a plastic casing. Thus, even if the connector is finished, the number and structure of conductive terminals of the connector can still be modified and customized by adjusting the primary connector sub-component and the secondary connector sub-component in response to development requirements for the electronic device.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A multi-piece connector including:

a primary connector sub-component including a primary assembling structure;

a secondary connector sub-component including a secondary assembling structure; and an assembling component for being respectively fitted to the primary assembling structure and the secondary assembling structure to assemble the primary connector sub-component with the secondary connector sub-component to form a connector sub-component assembly;

wherein the primary connector sub-component further includes a primary X-direction assembling sub-structure, a primary Y-direction assembling sub-structure and a primary Z-direction assembling sub-structure, and the secondary connector sub-component further includes a secondary X-direction assem-bling sub-structure, a secondary Y-direction assembling sub-structure and a secondary Z-direction assembling sub-structure, wherein in the connector sub-component assembly, the primary X-direction assembling sub-structure is attached to the secondary connector sub-component in X direction, the primary Y-direction assembling sub-structure is attached to the secondary connector sub-component in Y direction, the secondary X-direction assembling sub-structure is attached to the primary connect-or sub-component in X direction, the secondary Y-direction assembling sub-structure is attached to the primary connector sub-component in Y direction, and the assembling component is attached to the primary Z-direction assembling sub-structure and the secondary Z-direction assembling sub-structure respectively in Z-direction, wherein the X direction, the Y direction and the Z direction are vertical to each other.

2. The multi-piece connector according to claim 1, wherein the assembling component includes a primary assembling sub-component and a secondary assembling sub-component, wherein in the connector sub-component assembly, the primary assembling sub-component is fitted to the primary assembling structure, and the secondary assembling sub-component is fitted to the secondary assembling structure.

3. The multi-piece connector according to claim 2, wherein the primary assembling sub-component and the secondary assembling sub-component are combined and integrally formed.

4. The multi-piece connector according to claim 2, wherein the primary assembling sub-component includes a primary assembling sub-component interference structure, and the secondary assembling sub-component includes a secondary assembling sub-component interference structure, wherein in the connector sub-component assembly, the primary assembling sub-component interference structure is attached to the primary assembling structure, and the secondary assembling sub-component interference structure is attached to the secondary assembling structure.

5. The multi-piece connector according to claim 1, wherein the primary X-direction assembling sub-structure, the primary Y-direction assembling sub-structure and the primary Z-direction assembling sub-structure are combined to form a rectangular hole, and the secondary X-direction assembling sub-structure, the secondary Y-direction assembling sub-structure and the secondary Z-direction assembling sub-structure are combined to form a rectangular hole.

6. The multi-piece connector according to claim 1, wherein each of the primary Z-direction assembling sub-structure and the secondary Z-direction assembling sub-structure is a socket structure, and the assembling component has a plug structure, wherein in the connector sub-component assembly, the plug structure is plugged into the primary Z-direction assembling sub-structure and the secondary Z-direction assembling sub-structure.

7. The multi-piece connector according to claim 1, wherein the primary connector sub-component further includes a primary plastic core, and the primary plastic core includes a primary fitting block, wherein the primary X-direction assembling sub-structure, the primary Y-direction assembling sub-structure and the primary Z-direction assembling sub-structure are provided at the primary fitting block, wherein in the connector sub-component assembly, the primary fitting block enters the secondary connector sub-component to allow the primary X-direction assembling sub-structure and the primary Y-direction assembling sub-structure to be respectively attached to the secondary connector sub-component.

8. The multi-piece connector according to claim 7, wherein the secondary connector sub-component further includes a secondary plastic core, and the secondary plastic core includes a secondary fitting block, wherein the secondary X-direction assembling sub-structure, the secondary Y-direction assembling sub-structure and the secondary Z-direction assembling sub-structure are provided at the secondary fitting block, wherein in the connector sub-component assembly, the secondary fitting block enters the primary connector sub-component to allow the secondary X-direction assembling sub-structure and the secondary Y-direction assembling sub-structure to be respectively attached to the primary connector sub-component.

9. The multi-piece connector according to claim 8, wherein in the connector sub-component assembly, the secondary fitting block is adjacent to the primary fitting block, and the secondary Z-direction assembling sub-structure and the primary Z-direction assembling sub-structure are aligned in a row.

10. The multi-piece connector according to claim 8, wherein each of the secondary fitting block and the primary fitting block is a rectangular block.

11. The multi-piece connector according to claim 8, further including: a plastic casing having a receiving space for accommodating the primary plastic core and the secondary plastic core, wherein the primary plastic core includes a primary fastening structure, and the secondary plastic core includes a secondary fastening structure, wherein when the primary plastic core and the secondary plastic core are received in the receiving space, the primary fastening structure and the secondary fastening structure are fastened to the plastic casing to position the primary plastic core and the secondary plastic core respectively.

12. The multi-piece connector according to claim 11, further including: a primary jumper conductor, wherein the primary connector sub-component further includes at least one primary first conductive terminal and a plurality of primary second conductive terminals, wherein the primary jumper conductor goes over the primary first conductive terminal to reach and abut each of the primary second conductive terminals so as to make the primary second conductive terminals electrically connected to each other to form a primary second conductive circuit.

13. The multi-piece connector according to claim 12, further including: a secondary jumper conductor, wherein the secondary connector sub-component further includes at least one secondary first conductive terminal and a plurality of secondary second conductive terminals, wherein the secondary jumper conductor goes over the secondary first conductive terminal to reach and abut each of the secondary second conductive terminals so as to make the secondary second conductive terminals electrically connected to each other to form a secondary second conductive circuit.

14. The multi-piece connector according to claim 12, wherein the primary jumper conductor includes a primary jumper conductor interference structure, and the secondary jumper conductor includes a secondary jumper conductor interference structure, wherein the primary jumper conductor interference structure and the secondary jumper conductor interference structure are respectively for interfering with fitting to the assembling component.

15. The multi-piece connector according to claim 13, wherein the plastic casing further includes a primary abutting structure and a secondary abutting structure, wherein the primary abutting structure abuts and positions the primary first conductive terminal and the primary second conductive terminals, and the secondary abutting structure abuts and positions the secondary first conductive terminal and the secondary second conductive terminals.

16. The multi-piece connector according to claim 13, wherein the primary jumper conductor includes a primary jumper conductor body and a plurality of primary jumper conductor elastic arms, wherein the primary jumper conductor body is connected to the primary jumper conductor elastic arms, and each of the primary jumper conductor elastic arms elastically abuts one of the plurality of primary second conductive terminals; and the secondary jumper conductor includes a secondary jump-er conductor body and a plurality of secondary jumper conductor elastic arms, wherein the secondary jumper conductor body is connected to the secondary jumper conductor elastic arms, and each of the secondary jumper conductor elastic arms elastically abuts one of the plurality of secondary second conductive terminals.

17. The multi-piece connector according to claim 16, wherein the primary jumper conductor body is connected to the secondary jumper conductor body to make the primary jumper conductor and the secondary jumper conductor together form a jumper conductor assembly in which the primary second conductive circuit is electrically connected to the secondary second conductive circuit.

18. The multi-piece connector according to claim 17, wherein the assembling component is attached to the jumper conductor assembly in the Z direction so as to assemble the jumper conductor assembly with the connector sub-component assembly.

19. The multi-piece connector according to claim 17, wherein the jump-er conductor assembly is made of metallic conductor, and the assembling component is made of conductive plastic or insulating plastic.

* * * * *